US011150436B2

(12) United States Patent
Matsushita et al.

(10) Patent No.: US 11,150,436 B2
(45) Date of Patent: Oct. 19, 2021

(54) LENS UNIT

(71) Applicant: FUJIFILM Corporation, Tokyo (JP)

(72) Inventors: Shuhei Matsushita, Saitama (JP); Atsushi Kawanago, Saitama (JP)

(73) Assignee: FUJIFILM Corporation, Tokyo (JP)

(*) Notice: Subject to any disclaimer, the term of this patent is extended or adjusted under 35 U.S.C. 154(b) by 35 days.

(21) Appl. No.: 16/861,867

(22) Filed: Apr. 29, 2020

(65) Prior Publication Data

US 2020/0257075 A1    Aug. 13, 2020

Related U.S. Application Data

(63) Continuation of application No. PCT/JP2018/039772, filed on Oct. 25, 2018.

(30) Foreign Application Priority Data

Oct. 31, 2017  (JP) .............................. JP2017-210744

(51) Int. Cl.
*G02B 27/64* (2006.01)
*G02B 7/04* (2021.01)

(52) U.S. Cl.
CPC ............... *G02B 7/04* (2013.01); *G02B 27/64* (2013.01)

(58) Field of Classification Search
CPC . G02B 15/00; G02B 7/00; G02B 7/02; G02B 7/04; G02B 7/09; G02B 7/10; G02B 27/64; G02B 27/646
USPC ........................................................ 359/825
See application file for complete search history.

(56) References Cited

U.S. PATENT DOCUMENTS

| 5,392,160 A * | 2/1995 | Satoh | G02B 7/10 359/695 |
| 6,741,401 B2 * | 5/2004 | Nomura | G02B 7/10 359/699 |
| 2003/0081325 A1 * | 5/2003 | Nomura | G02B 7/10 359/700 |

(Continued)

FOREIGN PATENT DOCUMENTS

| JP | S62-034111 A | 2/1987 |
| JP | 2011-128313 A | 6/2011 |
| JP | 2016-109859 A | 6/2016 |

OTHER PUBLICATIONS

International Search Report issued in PCT/JP2018/039772; dated Dec. 25, 2018.

(Continued)

*Primary Examiner* — William R Alexander
(74) *Attorney, Agent, or Firm* — Studebaker & Brackett PC

(57) ABSTRACT

The lens holding frame is accommodated in the outer tube and is movable with respect to the outer tube in an optical axis direction (OAD) parallel to an optical axis of a lens optical system. The intermediate holding frame is a flexible frame body that constitutes the lens holding frame, is formed of a flexible material, and has a tubular shape. The intermediate holding frame is integrally provided with beam structures as abutments. The beam structures abut onto an inner circumferential surface of the outer tube in a state of being elastically deformed such that a restoring force is generated and prevent vibration caused by a gap between an outer circumferential surface of the lens holding frame and an inner circumferential surface of the outer tube.

15 Claims, 19 Drawing Sheets

(56) References Cited

U.S. PATENT DOCUMENTS

| | | | |
|---|---|---|---|
| 2014/0063296 A1* | 3/2014 | Ohya | H04N 5/23296 |
| | | | 348/240.3 |
| 2015/0103420 A1* | 4/2015 | Santo | G02B 7/10 |
| | | | 359/817 |
| 2016/0050373 A1* | 2/2016 | Nakamura | G03B 5/02 |
| | | | 348/208.11 |
| 2016/0126864 A1* | 5/2016 | Araki | G02B 7/09 |
| | | | 359/393 |
| 2016/0161704 A1 | 6/2016 | Shishido | |

OTHER PUBLICATIONS

International Preliminary Report on Patentability and Written Opinion issued in PCT/JP2018/039772; dated May 5, 2020.

\* cited by examiner

⟨COMPARATIVE EXAMPLE⟩

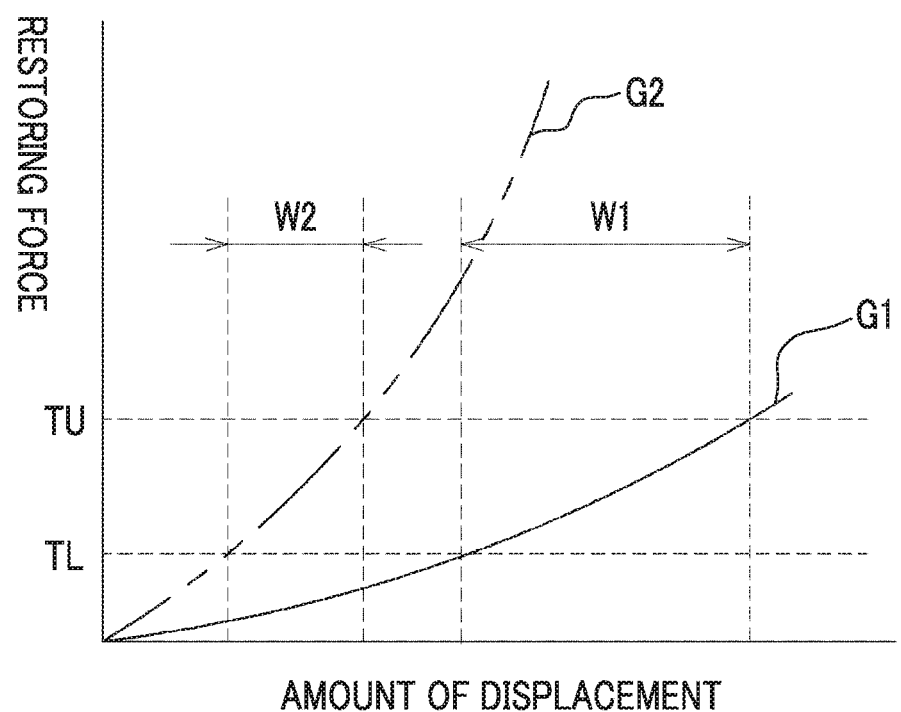

<COMPARATIVE EXAMPLE>

<COMPARATIVE EXAMPLE>

<COMPARATIVE EXAMPLE>

<COMPARATIVE EXAMPLE>

LENS UNIT

CROSS-REFERENCE TO RELATED APPLICATIONS

This application is a Continuation of PCT International Application No. PCT/JP2018/039772 filed on 25 Oct. 2018, which claims priority under 35 U.S.C. § 119(a) to Japanese Patent Application No. 2017-210744 filed on 31 Oct. 2017. The above application is hereby expressly incorporated by reference, in its entirety, into the present application.

BACKGROUND OF THE INVENTION

1. Field of the Invention

The present invention relates to a lens unit.

2. Description of the Related Art

A lens unit that comprises a plurality of lenses and a focusing mechanism for focusing on a specific subject has been known. Such a lens unit comprises an outer tube and a lens holding frame holding a lens optical system and the lens holding frame is accommodated in the outer tube and moves in an optical axis direction inside the outer tube for focus adjustment. The outer tube is provided with a focus ring that rotates with respect to the lens holding frame in a circumferential direction around the optical axis and when the focus ring is rotated by a user, the lens holding frame moves in the optical axis direction (for example, refer to JP1987-034111A (JP-S62-034111A)).

The outer tube is provided with a fastening member such as a screw and a bolt for fixing the lens holding frame at a desired focus position in the optical axis direction. The fastening member passes through the outer tube and fixes the lens holding frame at the desired focus position by abutting onto an outer circumferential surface of the focus ring that constitutes a part of the outer tube.

In addition, in order that the lens holding frame is held to be movable with respect to the outer tube in the optical axis direction, there is a gap between an inner circumferential surface of the outer tube and an outer circumferential surface of the lens holding frame. In a case where there is such a gap, the lens holding frame vibrates with respect to the outer tube due to the gap. When such vibration occurs, the position of the lens holding frame moves in various directions such as a radial direction, an optical axis direction, and a circumferential direction around an optical axis. When the position of the lens holding frame moves in various directions, for example, the range of a subject of which an image is formed on various image sensors such as a charged-coupled device (CCD) image sensor and a complementary metal-oxide-semiconductor (CMOS) image sensor fluctuates with respect to imaging surfaces of the image sensors.

In JP1987-034111A (JP-S62-034111A), an elastic ring (O-ring) is provided as a vibration control member for suppressing vibration of such a lens holding frame. The elastic ring is fitted into an annular groove that is formed on the outer circumferential surface of the lens holding frame along the circumferential direction. The elastic ring is pressed against the inner circumferential surface of the outer tube in a case where the lens holding frame is mounted into the outer tube. Accordingly, vibration of the lens holding frame caused by the gap between the outer circumferential surface of the lens holding frame and the inner circumferential surface of the outer tube is suppressed.

SUMMARY OF THE INVENTION

However, since a method of adding a vibration control member such as the elastic ring (O-ring) as described in JP1987-034111A (JP-S62-034111A) is a method of newly adding a vibration control member in addition to the components of the lens unit, there is a problem that the structure becomes complicated and large in size with an increase in the number of components and assembling properties are deteriorated.

An object of the present invention is to provide a lens unit with which it is possible to suppress vibration caused by a gap between an outer tube and a lens holding frame that moves with respect to the outer tube in an optical axis direction without an increase in number of components.

In order to solve the above problems, a lens unit according to an embodiment of the present invention comprises an outer tube, a lens holding frame, a flexible frame body, and an abutment. The lens holding frame is a lens holding frame that holds a lens optical system, is accommodated in the outer tube, and is movable with respect to the outer tube in an optical axis direction parallel to an optical axis of the lens optical system. The flexible frame body constitutes at least a part of the lens holding frame, is formed of a flexible material, and has a tubular shape. The abutment is integrally provided with the flexible frame body, abuts onto an inner circumferential surface of the outer tube in a state of being elastically deformed such that a restoring force is generated, and prevents vibration caused by a gap between an outer circumferential surface of the lens holding frame and the inner circumferential surface of the outer tube.

It is preferable that the abutment is a beam structure that is defined by a cut formed in an outer circumferential surface of the flexible frame body, and a protruding structure that further protrudes toward the inner circumferential surface of the outer tube than a vicinity of the beam structure is formed on the beam structure.

It is preferable that the beam structure is a cantilevered beam of which one end is a free end and the other end is a fixed end.

It is preferable that the protruding structure is disposed on the free end of the cantilevered beam and has an elongated shape of which a longitudinal direction is a direction orthogonal to a beam extending direction.

It is preferable that a plurality of the beam structures are provided on the outer circumferential surface of the flexible frame body.

It is preferable that, in a case where an object side of the lens optical system is a front side and an image side is a rear side in the optical axis direction, the beam structures include a front beam structure and a rear beam structure that are provided at an interval in the optical axis direction of the flexible frame body.

It is preferable that the beam structures are provided at a plurality of positions at an interval in a circumferential direction around the optical axis of the flexible frame body.

It is preferable that the beam structures are provided at two positions in the circumferential direction, and an interval between the beam structures at the two positions is 120° or 90°.

It is preferable that the front beam structures and the rear beam structures are provided at a plurality of positions at intervals in the circumferential direction around the optical axis.

It is preferable that the front beam structures and the rear beam structures, which are provided at the plurality of positions, are at the same positions as each other in the circumferential direction.

It is preferable that the lens unit further comprises an operation ring that is provided on the outer tube, is rotated in the circumferential direction around the optical axis, and moves the lens holding frame in the optical axis direction in a case where the operation ring is rotated and the front beam structures or the rear beam structures of the flexible frame body abut onto an inner circumferential surface of the operation ring.

It is preferable that at least a part of the inner circumferential surface of the operation ring has an inner circumferential screw structure that engages with an outer circumferential screw structure formed on an outer circumference of the lens holding frame and on which a groove is formed in the circumferential direction around the optical axis, at least one of the front beam structures or the rear beam structures abut onto the inner circumferential screw structure, and abutting positions between the beam structures abutting onto the inner circumferential screw structure and the inner circumferential screw structure change in accordance with a position of the lens holding frame in the optical axis direction and beam extending directions of the beam structures are orthogonal to the optical axis direction.

It is preferable that a fixation screw that presses a point on an outer circumferential surface of the operation ring toward the optical axis in a radial direction such that the inner circumferential surface of the operation ring is pressed against the outer circumferential surface of the flexible frame body and a position of the operation ring in the circumferential direction is fixed is provided, at least one of the front beam structures or the rear beam structures are disposed at two positions in the circumferential direction, positions of the beam structures at the two positions are disposed symmetrically with a straight line extending in a pressing direction of the fixation screw, which coincides with the radial direction, as an axis of symmetry, and an interval between the beam structures at the two positions is equal to or smaller than 120°.

It is preferable that a surface of the protruding structure that abuts onto the inner circumferential surface of the outer tube is formed as a curved surface having the same curvature as the inner circumferential surface in accordance with a shape of the inner circumferential surface.

It is preferable that a vicinity of the protruding structure is chamfered.

According to the present invention, it is possible to suppress movement of the lens holding frame in the circumferential direction that moves with respect to the outer tube in the optical axis direction without an increase in number of components.

BRIEF DESCRIPTION OF THE DRAWINGS

FIG. 16 is a graph showing the characteristics of a cantilevered beam and a double-supported beam.

FIG. 17A is a sectional view and FIG. 17B is a plan view.

DESCRIPTION OF THE PREFERRED EMBODIMENTS

[Configuration]

Figure 1:
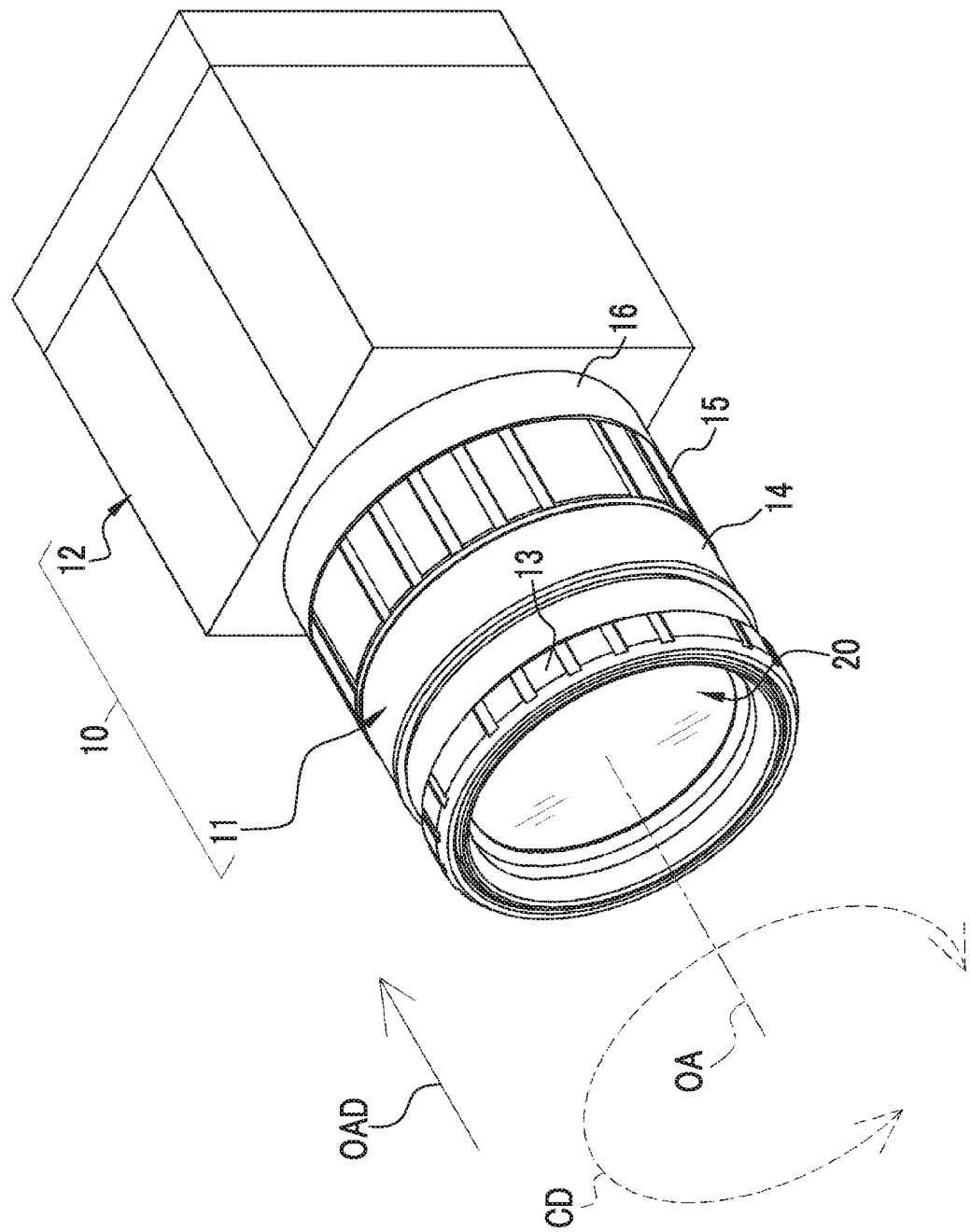
FIG. 1 is a perspective view showing a machine vision camera.
Figure 2:
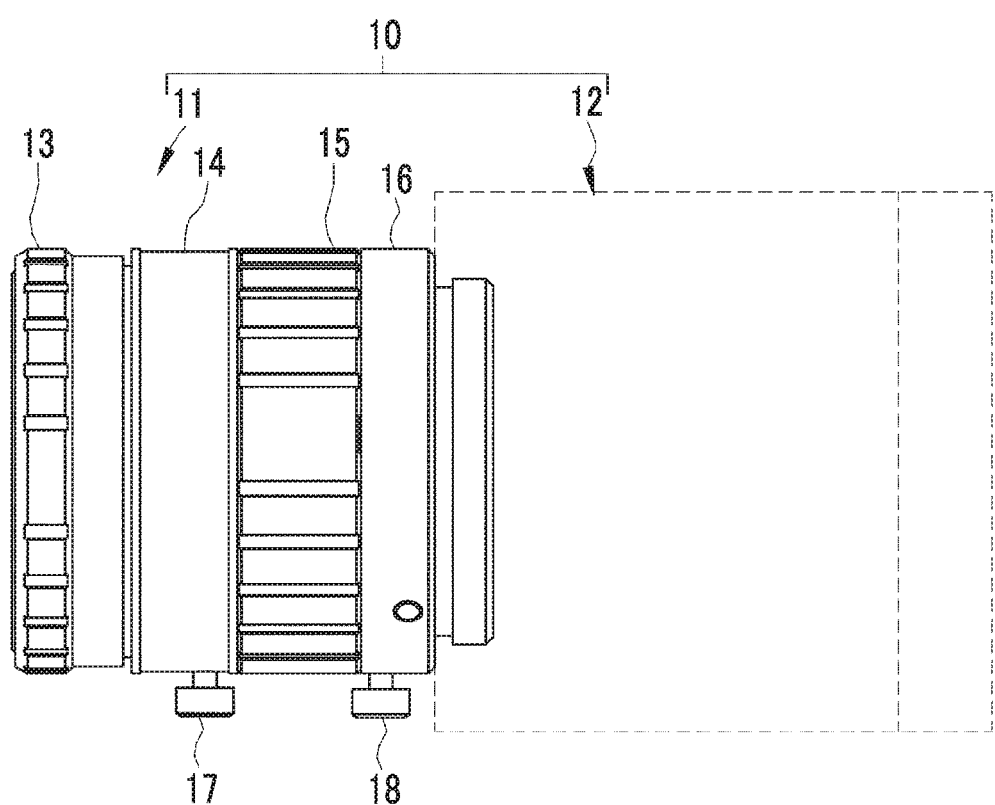
FIG. 2 is a side view of a lens unit.

In FIGS. 1 and 2, a machine vision camera 10 is used for, for example, factory automation such as inspection of an article in a production line of a factory and is composed of a lens unit 11 and a camera main body 12. An outer tube of the lens unit 11 is formed of, for example, a metal material such as an aluminum alloy which is light in weight and easy to process and is attachably and detachably attached to the camera main body 12. The lens unit 11 captures a subject image through a lens optical system 20. The lens unit 11 causes a subject image to be formed on an imaging surface of an image sensor (not shown) such as a charge coupled device (CCD) or a complementary metal oxide semiconductor (CMOS) built into the camera main body 12.

The image sensor outputs an imaging signal indicating the subject image. The camera main body 12 has a transmission unit (not shown) that transmits the imaging signal to an information processing apparatus such as a personal computer. The transmission unit is, for example, a universal serial bus (USB) interface or a gigabit local area network (LAN) standard interface. The information processing apparatus analyzes the imaging signal and determines whether an article is good or defective in accordance with the result of the analysis.

Figure 3:
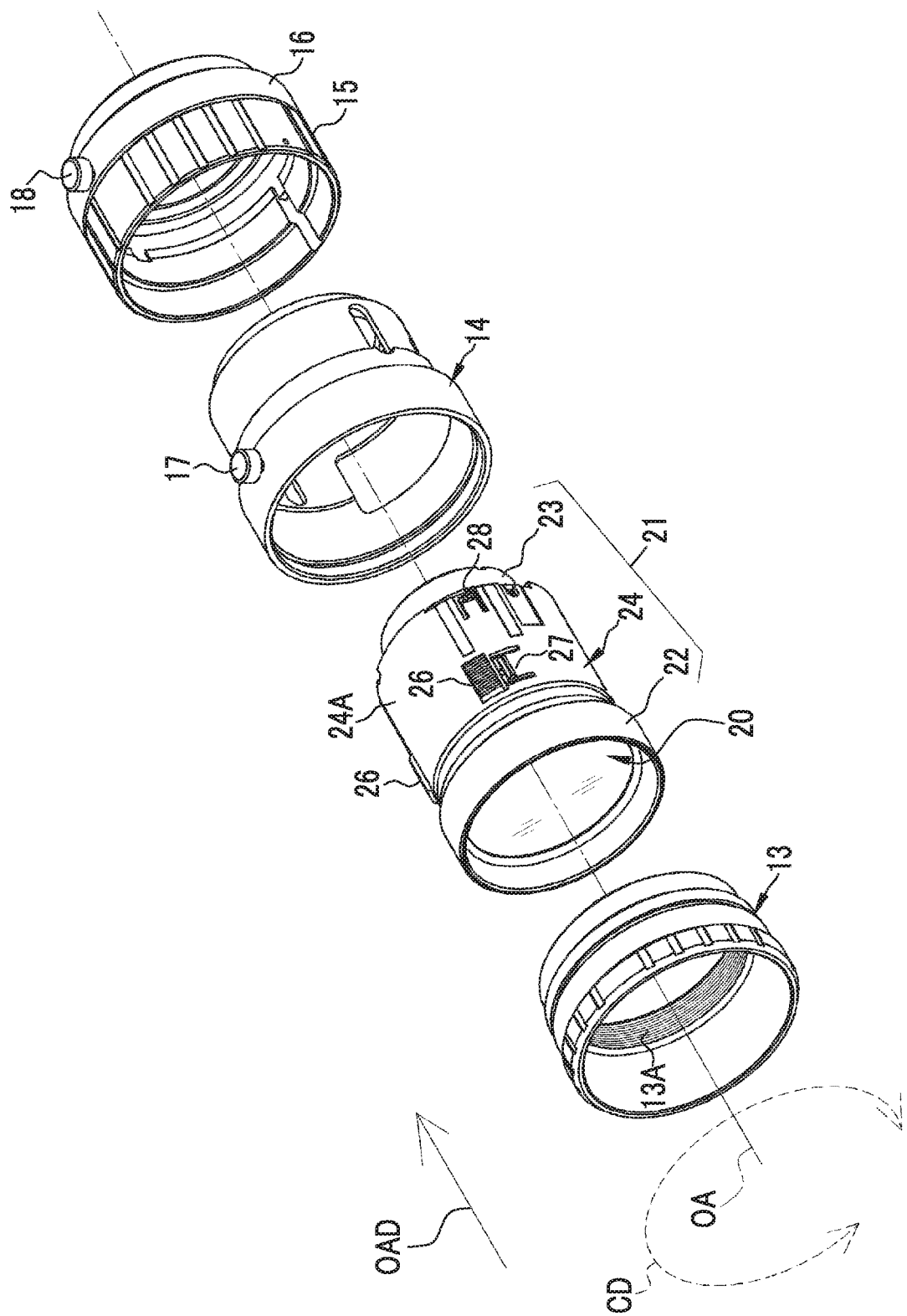
FIG. 3 is an exploded perspective view of a main part of the lens unit.
Figure 4:
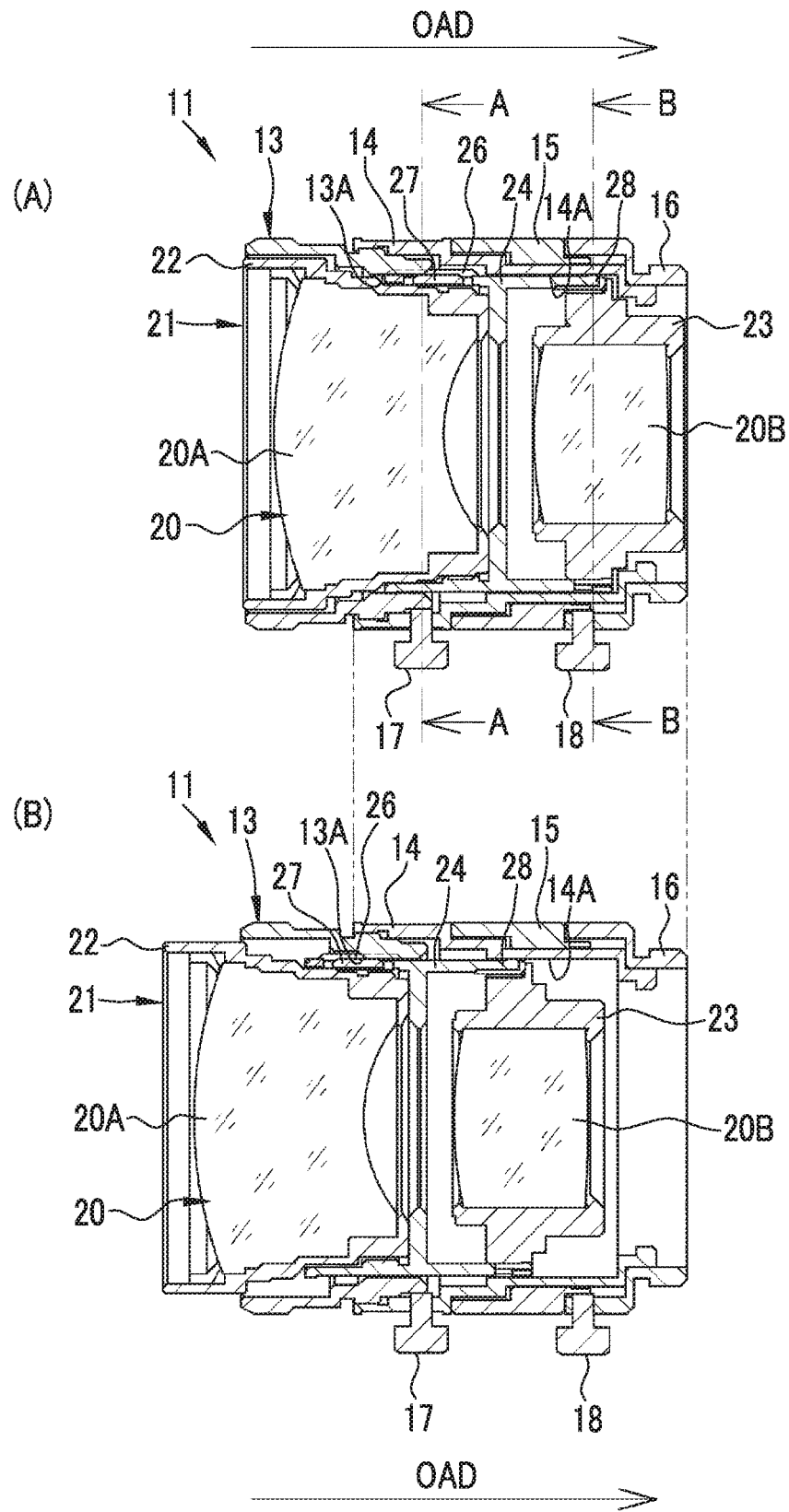
FIG. 4 is a cross-sectional view of the lens unit, where (A) of FIG. 4 is a sectional view of a state where a lens optical system is at the rearmost end and (B) of FIG. 4 is a sectional view of a state where the lens optical system is at the foremost end.

As shown in FIGS. 3 and 4, the lens unit 11 comprises a lens holding frame 21, a tube main body 14, a focus ring 13, an iris ring 15, and a retaining part 16, all of which are annular members.

The focus ring 13 and the iris ring 15 are rotated by a user along a circumferential direction CD represented by a broken line. The focus ring 13 is rotated in a case where focus adjustment for focusing on a specific subject is to be performed. The iris ring 15 is rotated in a case where the opening degree of a stop opening formed by stop leaf blades (not shown) is to be adjusted. The focus ring 13 and the iris ring 15 are attached to the tube main body 14 and constitute an outer tube accommodating the lens holding frame 21, together with the tube main body 14.

The lens holding frame 21 accommodates the lens optical system 20. The lens holding frame 21 is accommodated in the tube main body 14 and is movable with respect to the tube main body 14 in an optical axis direction OAD parallel to an optical axis OA of the lens optical system 20. Here, in the optical axis direction OAD, an object side of the lens optical system 20 will be referred to as a front side and an image side will be referred to as a rear side.

As shown in FIG. 4, the lens optical system 20 is composed of, for example, a front lens unit 20A and a rear lens unit 20B. The lens holding frame 21 comprises a front holding frame 22 that holds the front lens unit 20A, a rear holding frame 23 that holds the rear lens unit 20B, and an intermediate holding frame 24 that is disposed between the front holding frame 22 and the rear holding frame 23 and connects the front holding frame 22 and the rear holding frame 23 to each other. Note that, in the this example, each of the front lens unit 20A and the rear lens unit 20B is composed of by one lens. However, it is a matter of course that each of the front lens unit 20A and the rear lens unit 20B may be formed of a plurality of lenses.

The focus ring 13 and the iris ring 15 are rotatable with respect to the tube main body 14. The focus ring 13 is an operation ring that is rotated in the circumferential direction CD around the optical axis OA and corresponds to an operation ring that moves the lens holding frame 21 in the optical axis direction in a case where the operation ring is rotated. The retaining part 16 prevents the iris ring 15 from falling off.

A fixation screw 17 and a fixation screw 18 are attached to the lens unit 11. The fixation screw 17 is a fastening member for fixing the position of the focus ring 13 in the circumferential direction CD. The fixation screw 18 is a fastening member for fixing the position of the iris ring 15 in the circumferential direction CD.

As shown in FIG. 4, an inner circumferential surface of a front end part of the tube main body 14 and an outer circumferential surface of a rear end part of the focus ring 13 are engaged with each other such that the focus ring 13 is attached to the tube main body 14. The rear end part of the focus ring 13 is disposed in a state of being interposed between the inner circumferential surface of the tube main body 14 and an outer circumferential surface of the intermediate holding frame 24, which is a part of the lens holding frame 21. In addition, although the focus ring 13 is attached to the tube main body 14 such that the focus ring 13 can rotate in the circumferential direction CD, the position thereof in the optical axis direction OAD is fixed.

As shown in FIG. 3, the inner circumferential surface of the rear end part of the focus ring 13 is provided with an inner circumferential screw structure 13A. Meanwhile, the outer circumferential surface of the intermediate holding frame 24 is provided with outer circumferential screw structures 26 that engage with the inner circumferential screw structure 13A. The inner circumferential screw structure 13A is provided on the inner circumferential surface of the focus ring 13 over the entire circumference in the circumferential direction CD. On the other hand, the outer circumferential screw structures 26 are partially provided instead of being provided on the intermediate holding frame 24 over the entire circumference in the circumferential direction CD (refer to FIGS. 5 and 6 also). It is a matter of course that spiral grooves around the optical axis are formed on the inner circumferential screw structure 13A and the outer circumferential screw structures 26 and the inner circumferential screw structure 13A and the outer circumferential screw structures 26 move relative to each other in the optical axis direction OAD in a case where one of the spiral grooves rotates with respect to the other of the spiral grooves.

Since the inner circumferential screw structure 13A and the outer circumferential screw structures 26 are engaged with each other, the lens holding frame 21 is moved with respect to the tube main body 14 in the optical axis direction OAD in a case where the focus ring 13 is rotated in the circumferential direction CD. In this manner, focus adjustment is performed. (A) of FIG. 4 shows a state where the lens holding frame 21 is positioned at the rearmost end and (B) of FIG. 4 shows a state where the lens holding frame 21 is positioned at the foremost end.

A screw hole that the fixation screw 17 passes through and into which the fixation screw 17 is screwed is formed in the front end part of the tube main body 14. The fixation screw 17 is loosened at the time of focus adjustment such that focus ring 13 is allowed to rotate along the circumferential direction CD. In a case where the fixation screw 17 is fastened after the focus adjustment, a tip end of the fixation screw 17 abuts onto the outer circumferential surface of the focus ring 13 and presses a point on the outer circumferential surface of the focus ring 13 toward the optical axis OA in a radial direction.

With the point pressed as described above, the outer circumferential surface of the focus ring 13 is pressed against the inner circumferential surface of the tube main body 14. As a result, the rotation of the focus ring 13 is restricted by a frictional force generated between the focus ring 13 and the tube main body 14 and the position of the focus ring 13 with respect to the tube main body 14 in the circumferential direction CD is fixed.

Although not shown in FIG. 4, a stop mechanism composed of, for example, a plurality of stop leaf blades is built into the lens holding frame 21 and in a case where the iris ring 15 is rotated along the circumferential direction CD, the opening degree of the stop opening is adjusted. A screw hole that the fixation screw 18 passes through and into which the fixation screw 18 is screwed is formed in the retaining part 16.

The fixation screw 18 is loosened at the time of adjustment of the opening degree of the stop opening such that iris ring 15 is allowed to rotate along the circumferential direction CD. In a case where the fixation screw 18 is fastened after the adjustment of the opening degree of the stop opening, a tip end of the fixation screw 18 abuts onto an outer circumferential surface of the iris ring 15 and presses a point on the outer circumferential surface of the iris ring 15 toward the optical axis OA in the radial direction. With the point pressed as described above, an inner circumferential surface of the iris ring 15 is pressed against the outer circumferential surface of the intermediate holding frame 24. As a result, the rotation of the iris ring 15 is restricted by a frictional force generated between the iris ring 15 and the intermediate holding frame 24 and the position of the iris ring 15 in the circumferential direction CD is fixed at a position after the adjustment of the opening degree of the stop opening.

Figure 5:
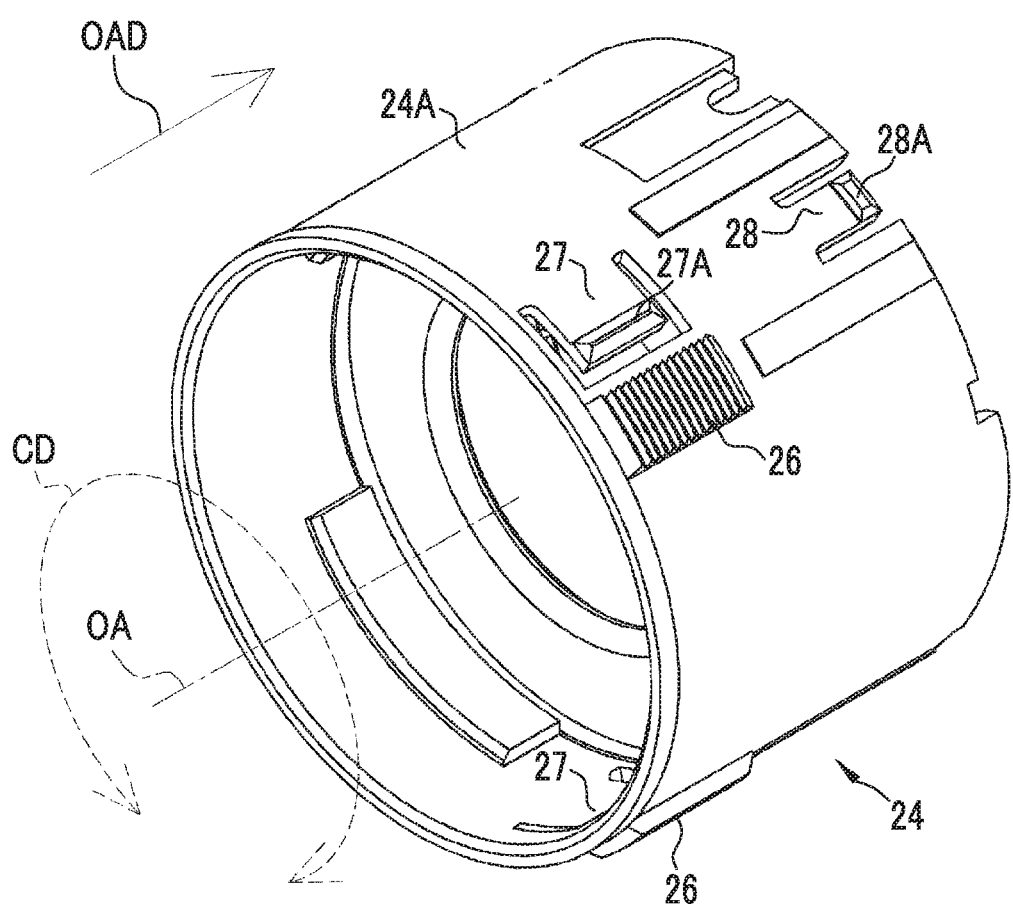
FIG. 5 is a perspective view of an intermediate holding frame.

As shown in FIG. 5, in addition to the outer circumferential screw structures 26, front beam structures 27 and rear beam structures 28 are provided on an outer circumferential surface 24A of the intermediate holding frame 24. The front beam structures 27 and the rear beam structures 28 are respectively disposed on a front end part and a rear end part of the intermediate holding frame 24 at intervals in the optical axis direction OAD.

Since the lens holding frame 21 is accommodated such that the lens holding frame 21 can move in the optical axis direction OAD with respect to the outer tube composed of the tube main body 14 and the focus ring 13, there is a gap formed between the outer circumferential surface 24A of the intermediate holding frame 24 and an inner circumferential surface of the outer tube. In addition, the outer circumferential screw structures 26 of the lens holding frame 21 engage with the inner circumferential screw structure 13A of the focus ring 13. There is a gap formed between screw grooves of the outer circumferential screw structures 26 and the inner circumferential screw structure 13A. A gap formed between the lens holding frame 21 and the outer tube includes the gap formed between the screw grooves.

Since there is a gap between the lens holding frame 21 and the outer tube as described above, the lens holding frame 21 wobbles and vibrates with respect to the outer tube due to the gap. When the lens holding frame 21 vibrates, the lens holding frame 21 moves in various directions such as a radial direction, the optical axis direction OAD, and the circumferential direction CD with respect to the outer tube. The front beam structures 27 and the rear beam structures 28 are abutments that abut onto the inner circumferential surface of the outer tube and restrain the lens holding frame 21 from moving in the various directions by preventing the vibration of the lens holding frame 21 with respect to the outer tube which is caused by the above-described gap.

The intermediate holding frame 24 is a flexible frame body that constitutes a part of the lens holding frame 21, is formed of a flexible material, and has a tubular shape. The flexible material is, for example, a resin material (plastic). The front beam structures 27 and the rear beam structures 28 are integrally formed with the intermediate holding frame 24 and are disposed on the outer circumferential surface 24A. The front beam structures 27 and the rear beam structures 28 are beam structures that are defined by cuts formed in the outer circumferential surface 24A of the intermediate holding frame 24.

On the front beam structures 27 and the rear beam structures 28, protruding structures 27A and 28A that further protrude toward the inner circumferential surface of the outer tube than the vicinities of the beam structures 27 and 28 are formed. The protruding structures 27A of the front beam structures 27 abut onto the inner circumferential screw structure 13A of the focus ring 13 (refer to FIG. 6 also). The rear beam structures 28 abut onto an inner circumferential surface 14A of the tube main body 14 (refer to FIG. 7 also). Both of the inner circumferential screw structure 13A and the inner circumferential surface 14A correspond to the inner circumferential surface of the outer tube.

Since the front beam structures 27 and the rear beam structures 28 are formed of flexible materials, the front beam structures 27 and the rear beam structures 28 are elastically deformed such that a restoring force is generated. Then, in a state where the restoring force is generated, the protruding structures 27A and 28A each abut onto the inner circumferential surface of the outer tube such that the lens holding frame 21 is prevented from vibrating.

Figure 6:
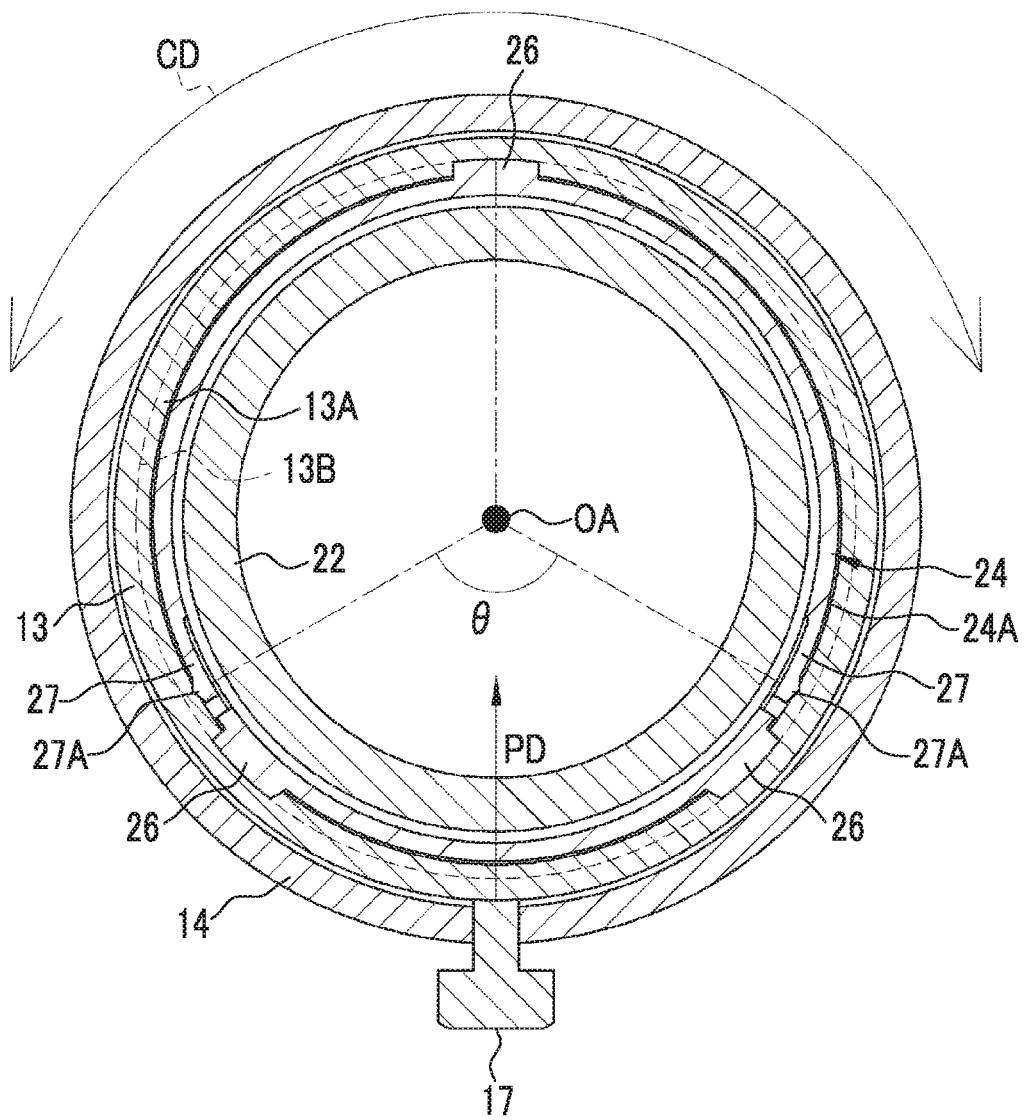
FIG. 6 is a longitudinal sectional view of the positions of front beam structures of the lens unit.
Figure 7:
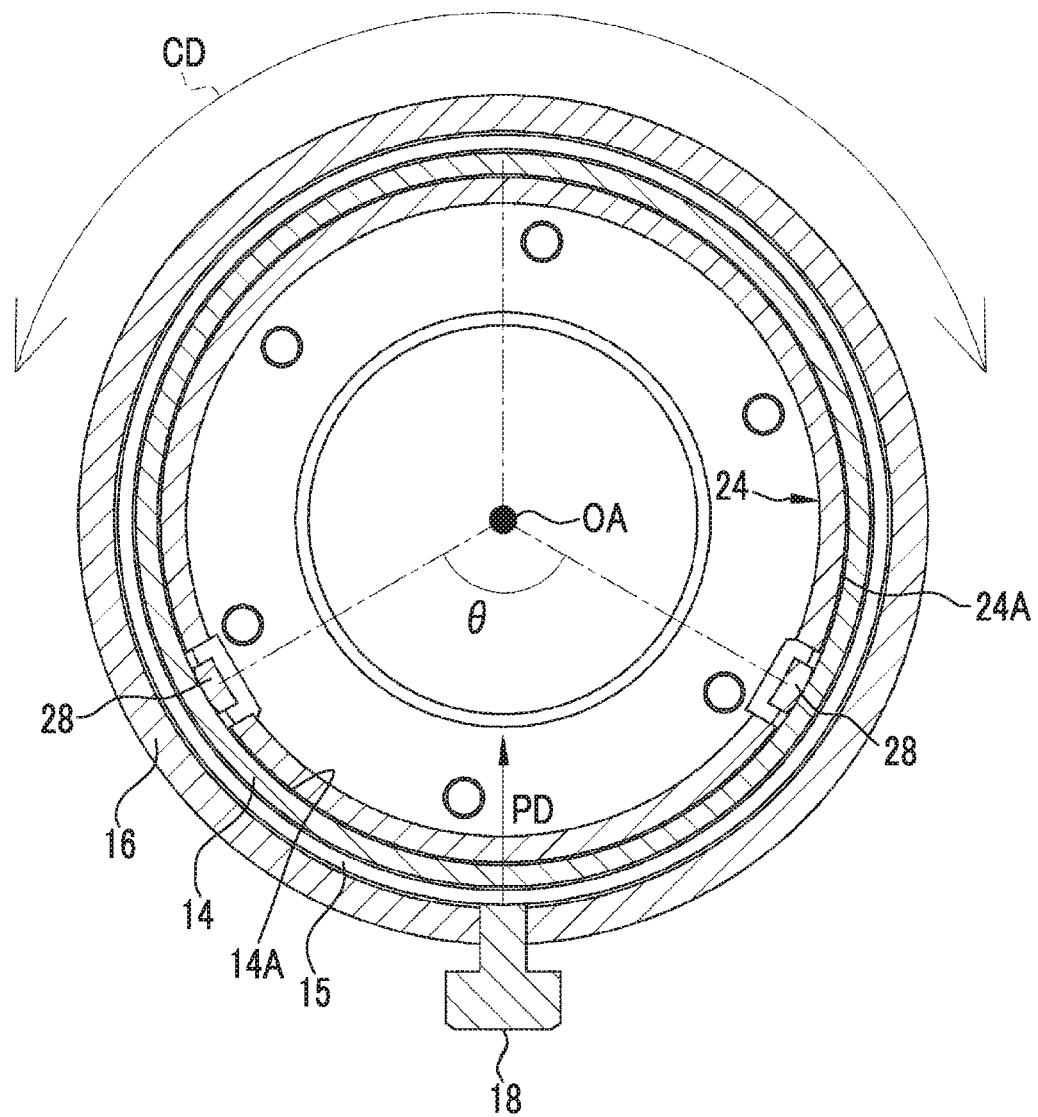
FIG. 7 is a longitudinal sectional view of the positions of rear beam structures of the lens unit.

FIGS. 6 and 7 are cross-sectional views showing a cross section of the lens unit 11 cut along a direction orthogonal to the optical axis OA. FIG. 6 is a sectional view showing a cross section taken along line A-A at which the front beam structures 27 in FIG. 4 are positioned and FIG. 7 is a sectional view showing a cross section taken along line B-B at which the rear beam structures 28 in FIG. 4 are positioned. Note that, in FIGS. 6 and 7, the lens optical system 20 is not shown for the sake of simplification of the drawings.

In FIG. 6, the outer circumferential screw structures 26 of the intermediate holding frame 24 are provided on the outer circumferential surface 24A of the intermediate holding frame 24 and radially protrude outward further than surfaces in the vicinities of the outer circumferential screw structures 26. In the present example, the outer circumferential screw structures 26 are provided at three positions at intervals of approximately 120° in the circumferential direction CD. The outer circumferential screw structures 26 engage with the inner circumferential screw structure 13A. A reference numeral "13B" denoted by a broken line represents a valley part (maximum outer diameter part) of the inner circumferential screw structure 13A. Mountain parts (maximum outer diameter parts) of the outer circumferential screw structures 26 engage with the valley part 13B of the inner circumferential screw structure 13A.

The front beam structures 27 are provided at two positions on the outer circumferential surface 24A at an interval θ in the circumferential direction CD. In the present examples, the front beam structures 27 are disposed at two positions from among positions obtained by dividing the entire circumference in the circumferential direction CD into three equal parts. That is, the interval θ between the two front beam structures 27 is 120°. In addition, the positions of the front beam structures 27 at the two positions are disposed symmetrically with a straight line extending in a pressing direction PD of the fixation screw 17 as the axis of symmetry.

In FIG. 7, similarly to the front beam structures 27, the rear beam structures 28 are provided at two positions on the outer circumferential surface 24A at the interval θ in the circumferential direction CD. In addition, the number of the rear beam structures 28 and how the rear beam structures 28 are disposed are the same as those of the front beam structures 27. That is, the rear beam structures 28 are disposed at two positions from among positions obtained by dividing the entire circumference in the circumferential direction CD into three equal parts and the interval between the two rear beam structures 28 is 120°. In addition, as with the front beam structures 27, the positions of the rear beam structures 28 at the two positions are also disposed symmetrically with a straight line extending in a pressing direction PD of the fixation screw 18 as the axis of symmetry.

Figure 8:
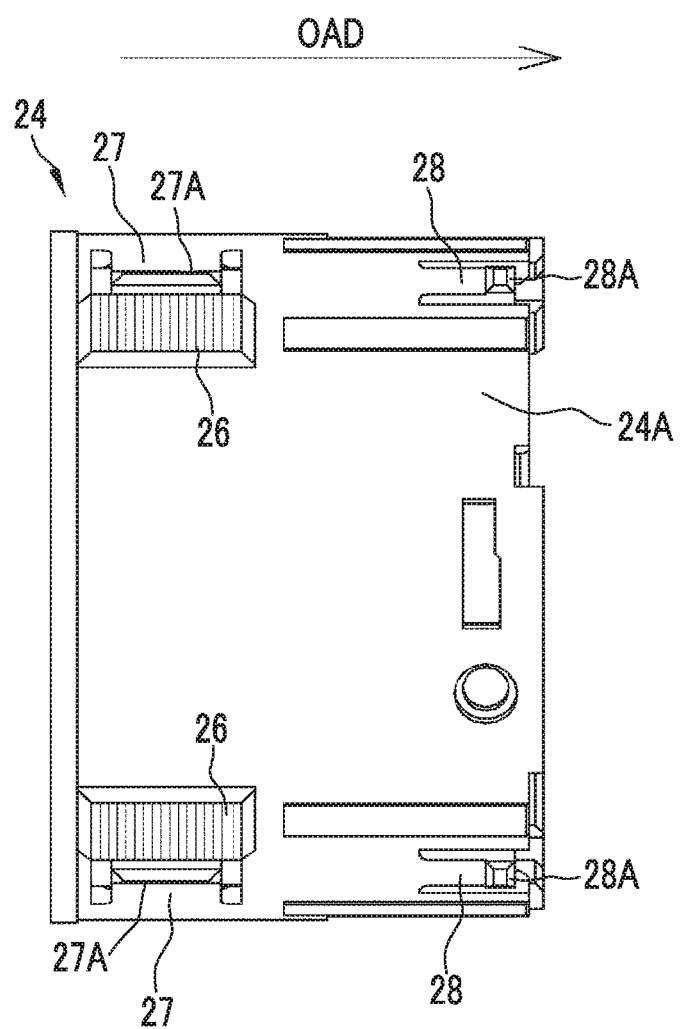
FIG. 8 is a side view of the intermediate holding frame.

As shown in FIG. 8 in addition to FIGS. 6 and 7, the front beam structures 27 and the rear beam structures 28, which are provided at a plurality of positions, are at the same positions as each other in the circumferential direction CD. This means not only that both of the interval θ between the two front beam structures 27 the interval θ between the two rear beam structures 28 are 120° and are the same as each other but also that the absolute positions thereof in the circumferential direction CD also coincide with each other.

Figure 9:
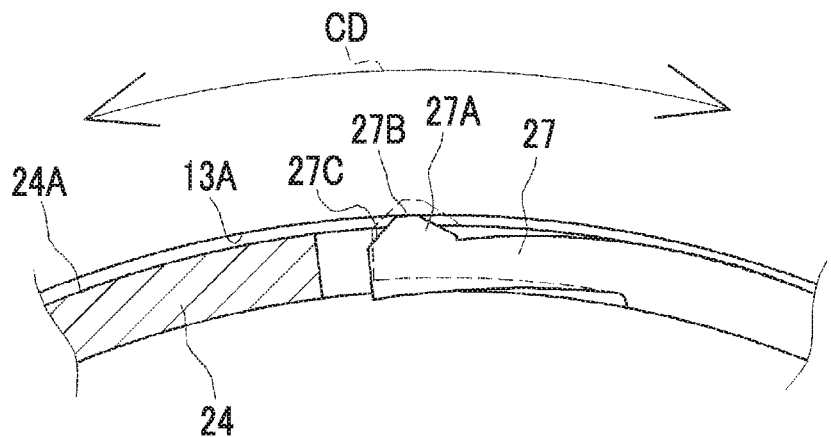
FIG. 9 is an enlarged cross-sectional view of the front beam structure.
Figure 10:
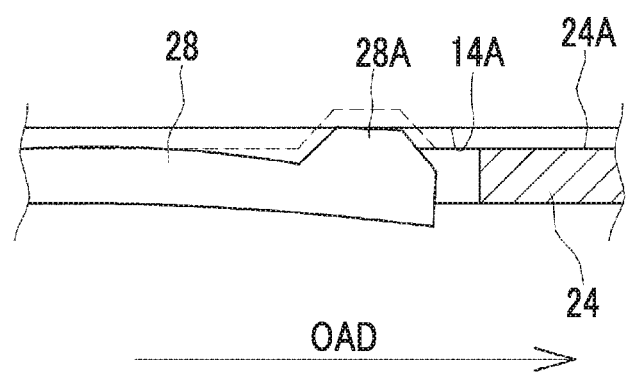
FIG. 10 is an enlarged longitudinal sectional view of the rear beam structure.

As shown in FIGS. 8 and 9, beam extending directions of the front beam structures 27, in which the front beam structures 27 extend, are orthogonal to the optical axis direction OAD. However, as shown in FIGS. 8 and 10, beam extending directions of the rear beam structures 28 coincide with the optical axis direction OAD. As shown in FIGS. 9 and 10, each of the front beam structures 27 and the rear beam structures 28 is a cantilevered beam of which one end is a free end and the other end is a fixed end.

As shown in FIG. 9, the protruding structure 27A of the front beam structure 27 is provided near the free end of the front beam structures 27. In FIG. 9, the position of the front beam structure 27 illustrated by a broken line represents a position in a natural state where no external force is applied to the front beam structure 27. In a state where the intermediate holding frame 24 and the focus ring 13 or the tube main body 14 are assembled, the protruding structure 27A abuts onto the inner circumferential screw structure 13A. Due to the abutting thereof, mainly a free end side of the front beam structure 27 is elastically deformed as illustrated by a solid line such that a restoring force is generated. The restoring force acts as a pressing force with respect to the inner circumferential screw structure 13A from the front beam structure 27.

In addition, the rear beam structures 28 are substantially the same as the front beam structures 27. That is, as shown in FIG. 10, a protruding structure 28A of the rear beam structure 28 is provided near the free end of the rear beam structure 28. In FIG. 10, the position of the rear beam structure 28 illustrated by a broken line represents a position in a natural state where no external force is applied to the rear beam structure 28. In a state where the intermediate holding frame 24 and the tube main body 14 are assembled, the protruding structure 28A abuts onto the inner circumferential surface 14A. Due to the abutting thereof, mainly a free end side of the rear beam structure 28 is elastically deformed as illustrated by a solid line such that a restoring force is generated. The restoring force acts as a pressing force with respect to the inner circumferential surface 14A from the rear beam structure 28.

Figure 12:
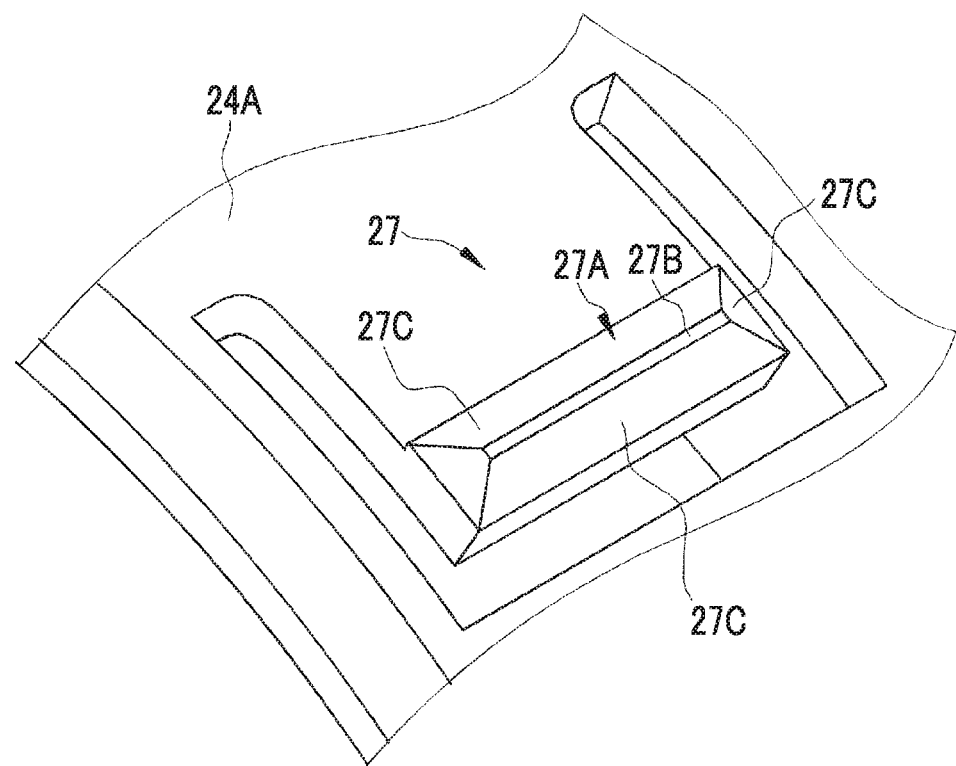
FIG. 12 is an enlarged view of the front beam structure.

In addition, the protruding structure 27A provided at the free end of the front beam structure 27 has an elongated shape of which the longitudinal direction (which coincides with optical axis direction OAD) is a direction orthogonal to the beam extending direction (refer to FIG. 12 also). Similarly, the protruding structures 28A provided at the free end of the rear beam structure 28 also has an elongated shape of which the longitudinal direction (which is orthogonal to optical axis direction OAD) is a direction orthogonal to the beam extending direction (refer to FIG. 13 also).

Figure 11:
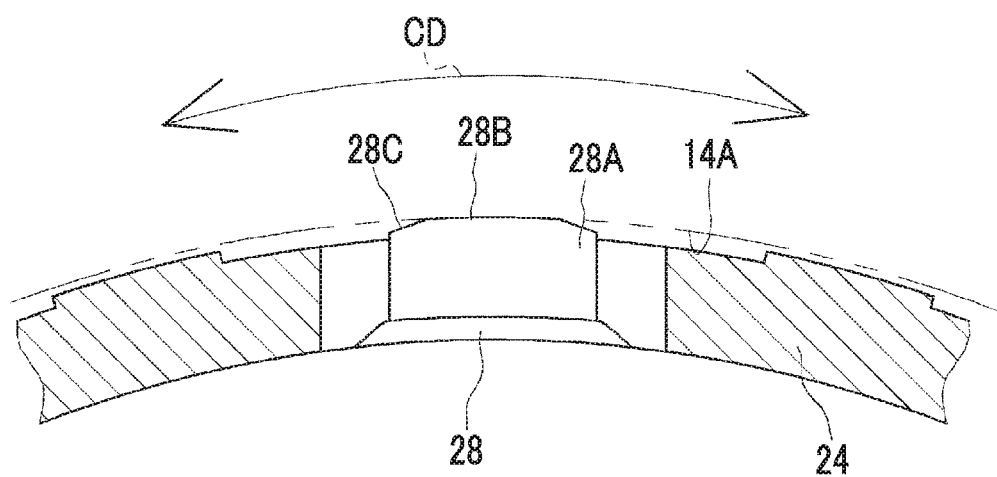
FIG. 11 is an enlarged cross-sectional view of the rear beam structure.

In addition, as shown in FIG. 9, regarding the protruding structure 27A of the front beam structure 27, an abutting surface 27B that abuts onto the inner circumferential screw structure 13A is formed as a curved surface having the same curvature as the inner circumferential screw structure 13A in accordance with the shape of the inner circumferential screw structure 13A. In addition, as shown in FIG. 11, regarding the protruding structure 28A of the rear beam structure 28, an abutting surface 28B that abuts onto the inner circumferential surface 14A is formed as a curved surface having the same curvature as the inner circumferential surface 14A in accordance with the shape of the inner circumferential surface 14A.

Figure 13:
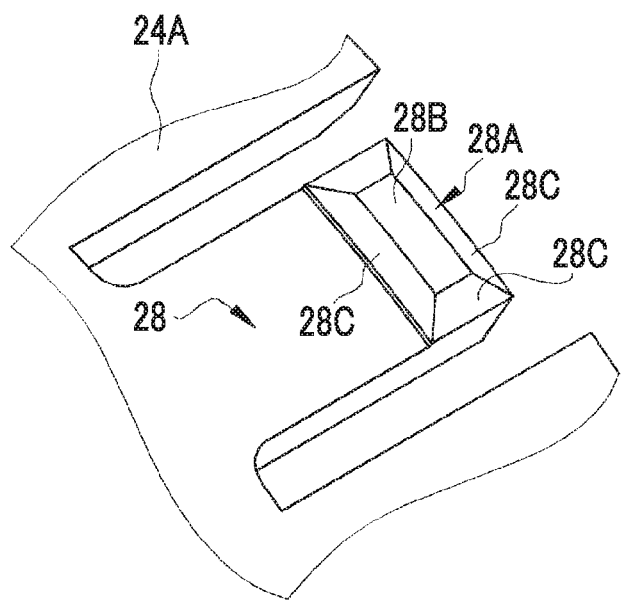
FIG. 13 is an enlarged view of the rear beam structure.

In addition, as shown in FIG. 12, edges in the vicinity of the abutting surface 27B of the protruding structure 27A of the front beam structure 27 are cut and chamfered such that inclined surfaces 27C are formed. As shown in FIG. 13, edges in the vicinity of the abutting surface 28B of the protruding structure 28A of the rear beam structures 28 are also cut and chamfered such that inclined surfaces 28C are formed.

[Effect]

Hereinafter, the effect of the above-described configuration will be described with reference to FIGS. 14 to 23 in addition to FIGS. 1 to 13 appropriately. The lens holding frame 21 is assembled by connecting the front holding frame 22 that holds the front lens unit 20A and the rear holding frame 23 that holds the rear lens unit 20B by means of the intermediate holding frame 24. The lens unit 11 is completed in a case where the lens holding frame 21 with the lens optical system 20 accommodated therein is inserted into the tube main body 14 and the focus ring 13, the iris ring 15, and the retaining part 16 are mounted onto the tube main body 14.

The vicinities of the abutting surfaces 27B and 28B of the protruding structures 27A and the protruding structures 28A of the front beam structures 27 and the rear beam structures 28 are chamfered as shown in FIGS. 12 and 13. Therefore, the front beam structures 27 and the rear beam structures 28 are less likely to be caught and broken during assembly.

In addition, in a case where the lens unit 11 is in an assembled state, the front beam structures 27 of the intermediate holding frame 24 are elastically deformed such that a restoring force is generated. In this state, the protruding structures 27A abut against the inner circumferential screw structure 13A of the focus ring 13. Similarly, in a state where the rear beam structures 28 of the intermediate holding frame 24 are elastically deformed such that a restoring force is generated, the protruding structures 28A abut onto the inner circumferential surface 14A of the tube main body 14. Therefore, vibration caused by the gap between the inner circumferential surface of the outer tube including the tube main body 14 and the outer circumferential surface of the lens holding frame 21 is prevented by the front beam structures 27 and the rear beam structures 28. Accordingly, the lens holding frame 21 is restrained from moving in various directions such as a radial direction, the optical axis direction OAD, and the circumferential direction CD.

In a case where the lens holding frame 21 is restrained from moving in the various directions, a fluctuation in range of a subject of which the image is formed on an image sensor is suppressed. The fluctuation in range of the subject has the following adverse effects. That is, in recent years, image processing such as subject recognition is performed based on a captured image obtained by an image sensor in many cases. In such a case, a fluctuation in range of a subject with respect to an imaging surface of the image sensor causes a decrease in subject position recognition accuracy.

As described above, due to the fixation screw 17 that fixes the focus ring 13, the position of the focus ring 13 in the circumferential direction CD is fixed. However, there is a gap between the inner circumferential surface of the outer tube and the outer circumferential surface 24A of the lens holding frame 21 including a gap between the screw grooves of the inner circumferential screw structure 13A of the focus ring 13 and the outer circumferential screw structures 26. Therefore, the lens holding frame 21 cannot be restrained from moving in the radial direction, the optical axis direction OAD, and the circumferential direction CD in a case where only the fixation screw 17 is provided. Since the front beam structures 27 and the rear beam structures 28 are provided, the lens holding frame 21 is restrained from moving in various directions such as the radial direction, the optical axis direction OAD, and the circumferential direction CD as described above.

The front beam structures 27 and the rear beam structures 28 as described above are integrally formed with the intermediate holding frame 24 which is formed of a flexible material. Therefore, an increase in number of components can be suppressed in comparison with a case where an elastic member such as a spring or rubber is provided separately from the lens holding frame 21. Furthermore, it is possible to take measures to prevent vibration at low cost while achieving space saving in comparison with a case where an elastic member is provided separately from the lens holding frame 21.

In addition, as the material of the intermediate holding frame 24 with which the front beam structures 27 and the rear beam structures 28 are integrally provided, plastic is used. Since plastic is excellent in moldability, it is possible to further suppress an increase in component cost. Furthermore, the front beam structures 27 and the rear beam structures 28 are defined by the cuts formed in the outer circumferential surface of the intermediate holding frame 24. Therefore, making a cut in the outer circumferential surface 24A of the intermediate holding frame 24, which is a plastic tubular member, is easy in resin molding and is also excellent in moldability. Therefore, an increase in manufacturing cost can be suppressed more with the front beam structures 27 and the rear beam structures 28 defined with cuts as described above.

In addition, since the area of contact between the front beam structures 27 or the rear beam structures 28 and the outer tube is small in comparison with a case where an elastic ring that is disposed over the entire circumference of the lens holding frame 21 in the circumferential direction CD is provided separately from the lens holding frame 21, it is possible to smoothly move the lens holding frame 21 during focus adjustment.

In addition, as shown in FIG. 9 and FIG. 11, the protruding structures 27A and 28A of the front beam structures 27 and the rear beam structures 28 have the abutting surfaces 27B and 28B which have the same curvatures as the inner circumferential screw structure 13A and the inner circumferential surface 14A in accordance with the shapes thereof. Therefore, a resistance force generated in a case where the lens holding frame 21 is moved in the optical axis direction OAD is reduced and thus it is possible to smoothly move the lens holding frame 21.

In addition, since the front beam structures 27 and the rear beam structures 28 are provided at an interval in the optical axis direction OAD, the lens holding frame 21 can be prevented from pitching in the outer tube in a case where the lens holding frame 21 moves in the optical axis direction OAD. In addition, since the front beam structures 27 and the rear beam structures 28 are at the same positions in the circumferential direction CD, the lens holding frame 21 is not inclined forward or backward with respect to the optical axis OA.

Figure 14:
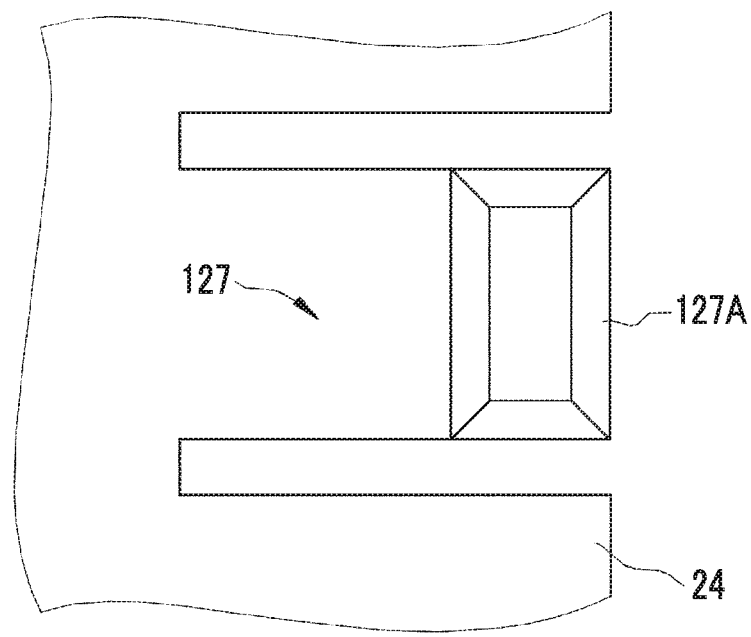
FIG. 14 is an explanatory view of a cantilevered beam.
Figure 15:
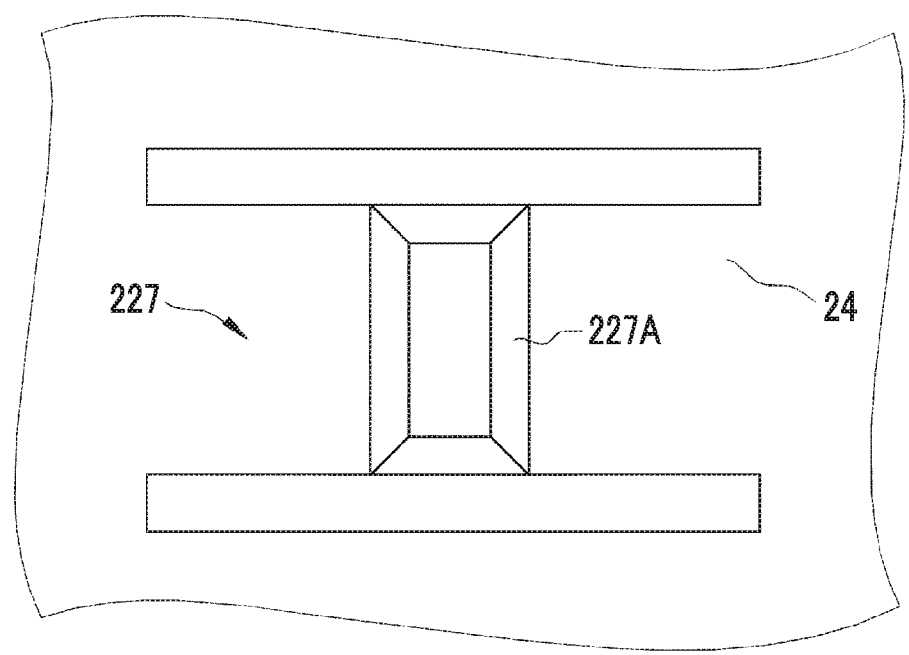
FIG. 15 is an explanatory view of a double-supported beam.

In addition, since the front beam structures 27 and the rear beam structures 28 are cantilevered beams, the following effects can be achieved. FIG. 14 is a plan view of a cantilevered beam 127 similar to the above-described front beam structure 27. The cantilevered beam 127 is provided with a protruding structure 127A similar to the protruding structure 27A of the front beam structure 27. Meanwhile, FIG. 15 shows a double-supported beam 227 according to a comparative example. The double-supported beam 227 is fixed at opposite ends and the central part thereof has a protruding structure 227A that abuts onto the inner circumferential screw structure 13A, for example.

FIG. 16 shows graphs for comparison between the characteristics of the cantilevered beam 127 and the characteristics of the double-supported beam 227. In the graph of FIG. 16, the horizontal axis represents the amount of displacement (amount of bending) in the case of elastic deformation of a beam and the vertical axis represents a restoring force corresponding to the amount of displacement. The amount of displacement is, for example, as shown in FIG. 9, a distance from a reference position, which is a position (position illustrated by broken line) of the protruding structure 127A or the protruding structure 227A in a natural state, to a position (position illustrated by solid line) after displacement of the protruding structure 127A or the protruding structure 227A in the case of elastic deformation. A graph G1 shows the characteristics of the cantilevered beam 127 shown in FIG. 14 and a graph G2 shows the characteristics of the double-supported beam 227 shown in FIG. 15.

As shown in FIG. 16, both of the graphs show that a restoring force increases as the amount of displacement increases. However, the cantilevered beam 127 is easily bent in comparison with the double-supported beam 227 and a change in restoring force with respect to the amount of displacement is small. For example, a case where the target value range of a restoring force is set to an upper limit value TU to a lower limit value TL will be described. Although the range of the amount of displacement of the double-supported beam 227 allowable for making a restoring force fall within the target value range is W2, the range of the amount of displacement of the cantilevered beam 127 allowable for making a restoring force fall within the target value range is W1, which is greater than W2. This means that a restoring force generated by the cantilevered beam 127 is more likely to fall within a target range than a restoring force generated by the double-supported beam 227 even in a case where the elasticity of the double-supported beam 227 or the cantilevered beam 127 fluctuates due to individual differences at the time of manufacture, for example. That is, the cantilevered beam 127 further facilitates restoring force management than the double-supported beam 227.

Therefore, in the case of the cantilevered beam 127, it is easy to achieve both of a resistance force that is generated due to a restoring force in a case where the lens holding frame 21 is moved in the optical axis direction OAD and a force for suppressing vibration in a case where the lens holding frame 21 is positioned at a desired position in the optical axis direction OAD while keeping the optimum balance therebetween.

Such characteristics of the cantilevered beam 127 are particularly effective for a lens unit in which the focus ring 13 is manually operated to move the lens holding frame 21 and the lens holding frame 21 is fixed at a predetermined focus position by being fastened with a screw as in the case of the lens unit 11 which is used for a machine vision lens in the present example. This is because achieving both of a decrease in resistance force in the case of movement of the lens holding frame 21 and suppression of vibration in the case of fixation of the position of the lens holding frame 21 is significantly important in terms of the usability of a lens in a case where the movable lens holding frame 21 is fixed by being fastened with a screw only.

Particularly, due to an increase in image sensor resolution, the allowable magnitude of vibration of the lens holding frame 21 is small. That is, in a case where there is an increase in image sensor resolution, the pixel pitch becomes small, the lower limit of the range of oscillation recognized as vibration is lowered, and thus even a slight vibration becomes likely to be recognized as vibration. In this case, the allowable range of vibration becomes small in comparison with the related art and thus it is desirable to increase a pressing force for reliable positioning. However, there is also a demand that the sacrifice of the operability is to be minimized. In this case, the target value range (range from upper limit value TU to lower limit value TL) shown in FIG. 16 becomes narrow in order that the pressing force becomes an optimum value. As described above, in a case where there is an increase in image sensor resolution, restoring force management for achieving both of the operability and reliable positioning becomes more important. Therefore, the cantilevered beam 127, with which it is possible to manage a restoring force easily in comparison with the double-supported beam 227, is significantly effective.

Figure 17A:
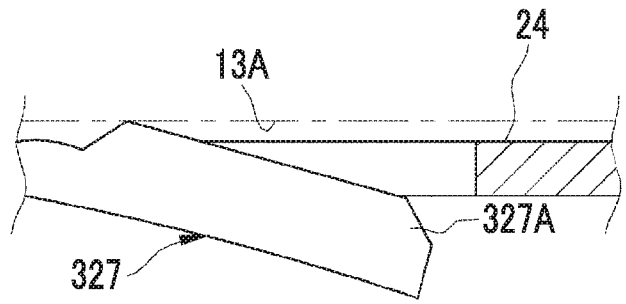
FIGS. 17A and 17B are explanatory views of a beam structure on which a protruding structure is present over the entire region in a beam extending direction, where
Figure 17B:
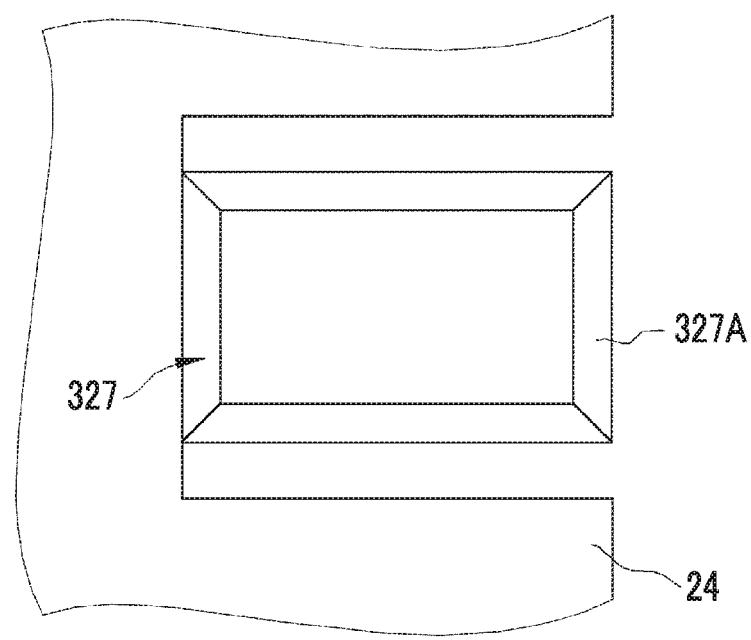

In addition, as shown in FIG. 6 and the like, on the front beam structures 27 and the rear beam structures 28, each of the protruding structures 27A and 28A is disposed at the free end and has an elongated shape of which the longitudinal direction is a direction orthogonal to the beam extending direction. For example, it is also conceivable to provide a cantilevered beam 327, on which a protruding structure 327A is provided over the entire area in a beam extending direction as shown in FIG. 17, instead of the elongated protruding structure in the present example. In FIGS. 17A and 17B, FIG. 17A is a side view of the cantilevered beam 327 and FIG. 17B is a plan view of the cantilevered beam 327. The front beam structures 27 and the rear beam structures 28 on which the elongated protruding structures 27A and 28A are disposed at the free ends as in the present example are easily bent in comparison with the cantilevered beam 327 shown in FIGS. 17A and 17B and thus it is easy to manage a restoring force.

In addition, the front beam structures 27 are provided at two positions at the interval θ in the circumferential direction CD and the rear beam structures 28 are provided at two positions at the interval θ in the circumferential direction CD. Therefore, a vibration suppressing effect is high in comparison with a case where the front beam structure 27 is provided at one position and the rear beam structure 28 is provided at one position.

In addition, the intervals θ between the front beam structures 27 and the rear beam structures 28 in the circumferential direction CD are equal to or smaller than 120°. According to such a configuration, the position of the optical axis OA can be easily stabilized in comparison with a case where the front beam structures 27 are provided at three or more positions and the rear beam structures 28 are provided at three or more positions in the circumferential direction CD. The above-described effect will be described with reference to FIG. 18.

Figure 18:
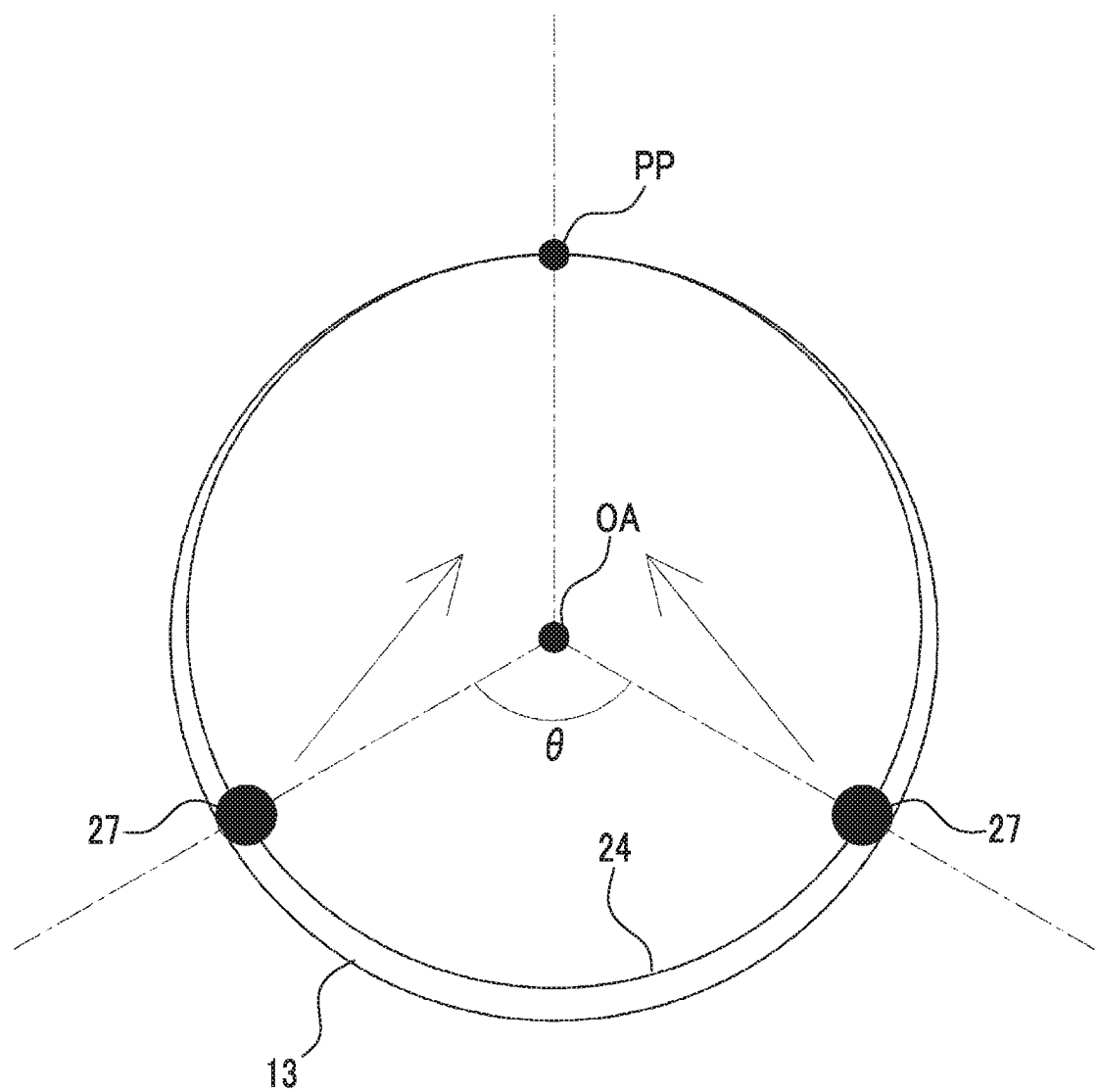
FIG. 18 is an explanatory view of an effect obtained in a case where beam structures are provided at two positions in a circumferential direction.

FIG. 18 is an explanatory view schematically showing the positional relationship between the intermediate holding frame 24 and the focus ring 13 constituting the outer tube established in a case where the front beam structures 27 are provided at two positions at the interval θ of 120° in the circumferential direction CD as described above.

As shown in FIG. 18, in a case where the front beam structures 27 are provided at two positions from among three positions obtained by dividing the circumferential direction CD into three equal parts, the intermediate holding frame 24 is biased toward one point PP, which is the rest of the three positions, due to restoring forces (pressing forces) generated by the front beam structures 27 at the two positions. In this case, the position of the intermediate holding frame 24 in a radial direction can be stabilized with the intermediate holding frame 24 biased toward the point PP in a case where the restoring forces of the front beam structures 27 are set to such forces that the intermediate holding frame 24 can be pressed against the point PP. In this case, the pressing forces of the front beam structures 27 may not be strictly equal to each other as long as the pressing forces of the front beam structures 27 are equal to or greater than a predetermined value. Accordingly, the intermediate holding frame 24 is biased and thus the position of the intermediate holding frame 24 can be stabilized. As a result, the position of the optical axis OA is stabilized.

Meanwhile, in a case where the front beam structures 27 are provided at the three positions obtained by dividing the circumferential direction CD into three equal parts, the position of the intermediate holding frame 24 in the radial direction is not stabilized and the position of the optical axis OA is not stabilized in a case where the restoring forces of the front beam structures 27 at the three positions are not made equal to each other. In consideration of individual differences at the time of manufacture or the like, it is difficult to make the restoring forces of the front beam structures 27 at the three positions equal to each other and it is easier to set the restoring forces the front beam structures 27 at two positions to be equal to or greater than the predetermined value in terms of design. By disposing the front beam structures 27 at the two positions in the circumferential direction CD at the interval θ of equal to or smaller than 120° as in the present example, it is possible to stabilize the position of the intermediate holding frame 24 in the radial direction without making the restoring forces of the front beam structures 27 equal to each other. Therefore, it is possible to easily stabilize the position of the optical axis OA.

Note that, in the present example, an example in which the interval θ is 120° has been described. However, the interval θ may be 90°. That is, in a case where the intermediate holding frame 24 can be positioned with respect to the outer tube at three points including the front beam structures 27 at the two positions and the point PP onto which the intermediate holding frame 24 abuts while being biased, the interval θ may be any degrees. However, in a case where the interval θ is 180°, the intermediate holding frame 24 cannot be biased and thus it is preferable that the interval θ at which the intermediate holding frame 24 can be biased is equal to or smaller than 120°. In addition, although FIG. 18 is an example about the front beam structures 27, the same applies to the rear beam structures 28.

In addition, as shown in FIG. 6, the fixation screw 17 presses a point on the outer circumferential surface of the focus ring 13 toward the optical axis OA in the radial direction such that the outer circumferential surface of the focus ring 13 is pressed against the inner circumferential surface of the tube main body 14 and the position of the focus ring 13 in the circumferential direction CD is fixed.

The positions of the front beam structures 27 at the two positions are disposed symmetrically with the straight line extending in the pressing direction PD of the fixation screw 17 as the axis of symmetry. The pressing direction PD coincides with the radial direction. Furthermore, the interval θ between the front beam structures 27 at the two positions in the circumferential direction CD is equal to or smaller than 120°. According to such a configuration, the following effects can be achieved.

Figure 19:
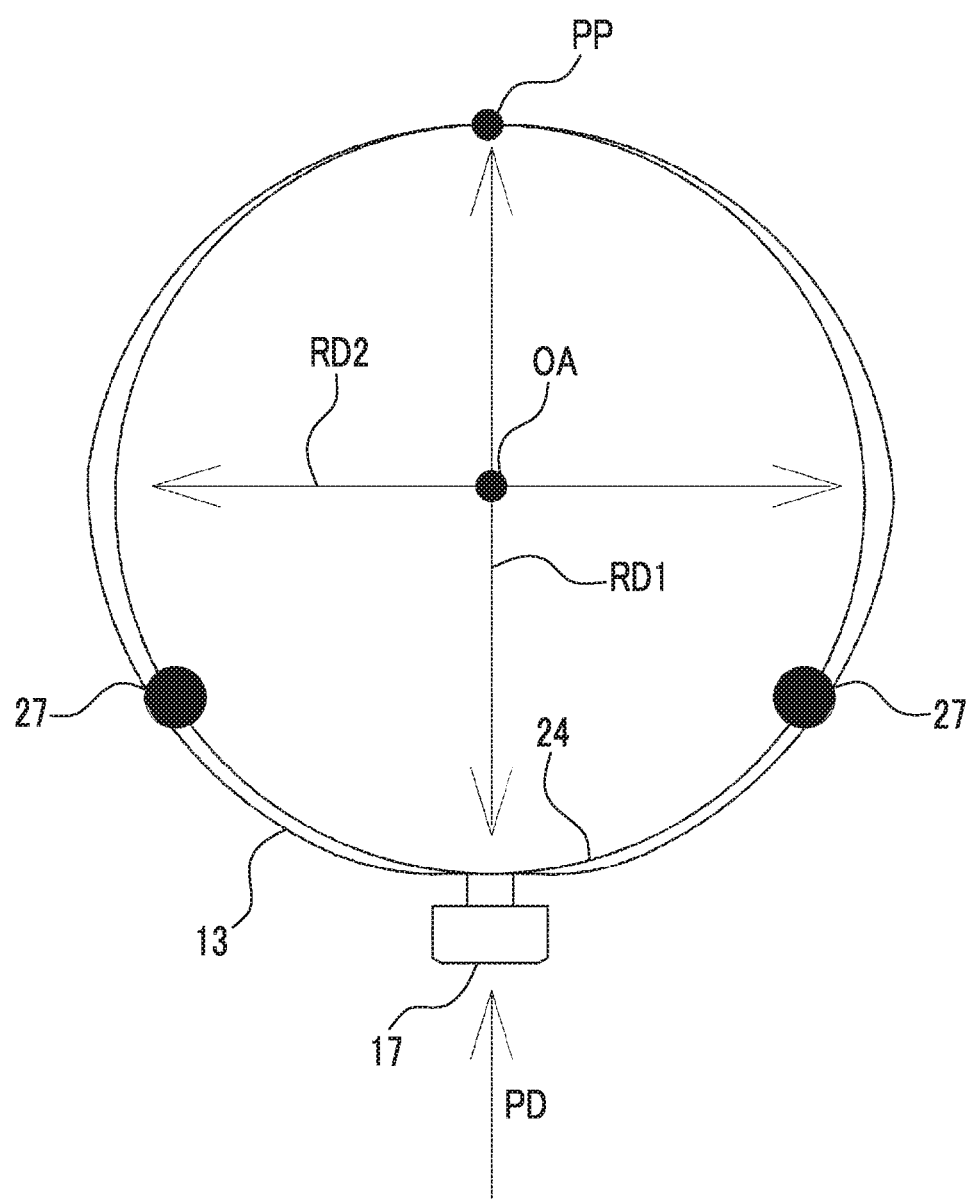
FIG. 19 is an explanatory diagram of an effect obtained by beam structures at two positions that are disposed symmetrically with a pressing direction of a fixation screw as the axis of symmetry.

FIG. 19 is a schematic view showing how the focus ring 13 is in a case where the fixation screw 17 is fastened. As shown in FIG. 19, in a case where the fixation screw 17 is fastened, the focus ring 13 is pressed in a radial direction RD1 that coincides with the pressing direction PD of the fixation screw 17. As a result, the focus ring 13 is deformed such that a diameter thereof in the radial direction RD1 is decreased and a diameter thereof in a radial direction RD2 orthogonal to the radial direction RD1 is increased. In a case where the diameter of the focus ring 13 is increased, a gap between the focus ring 13 and the intermediate holding frame 24 is enlarged. In a case where the gap is enlarged, the pressing forces of the front beam structures 27 are also reduced.

Figure 20:
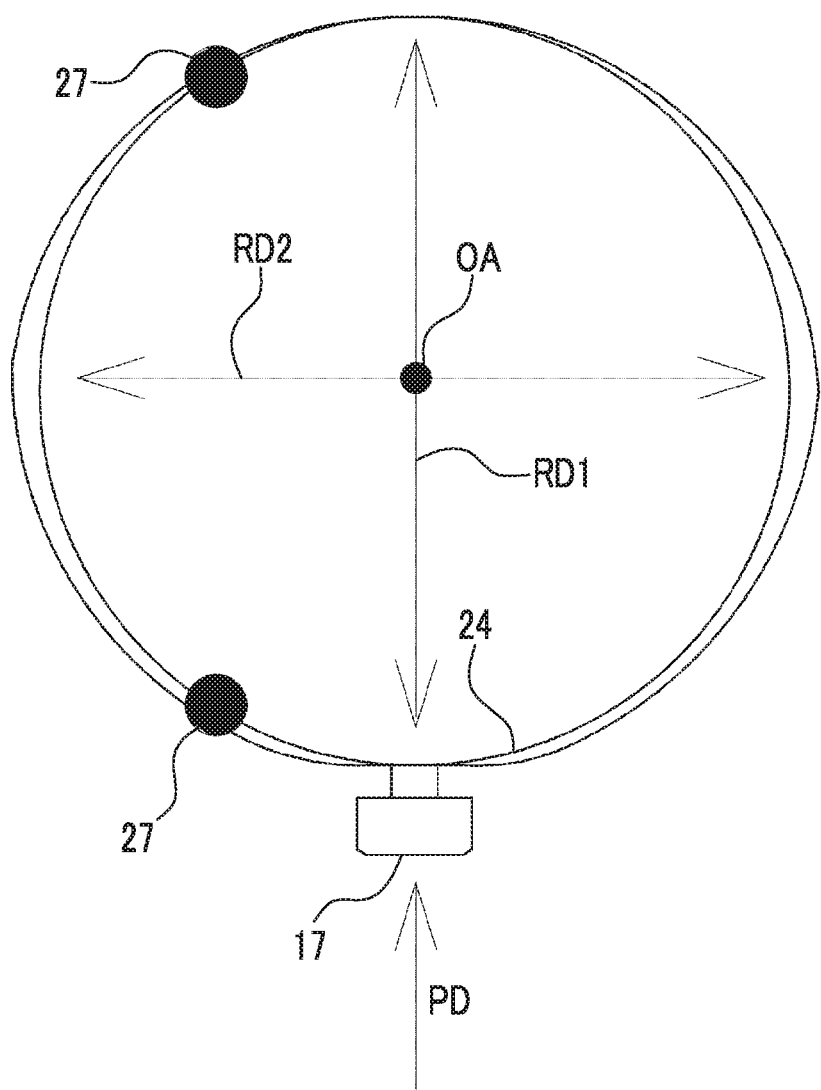
FIG. 20 is an explanatory view of a comparative example with respect to FIG. 19.

For example, FIG. 20 is an example where two front beam structures 27 are disposed symmetrically with the radial direction RD2 orthogonal to the pressing direction PD of the fixation screw 17 as the axis of symmetry. The interval θ between the front beam structures 27 at the two positions is 120°. In this case, at the position of each front beam structure 27, the gap is enlarged due to the fixation screw 17 fastened. Therefore, the pressing forces of the front beam structures 27 are reduced.

Therefore, in a case where the front beam structures 27 are disposed symmetrically with the straight line extending in the pressing direction PD of the fixation screw 17 as the axis of symmetry and the interval between the front beam structures 27 at the two positions is set to be equal to or smaller than 120° as in the present example shown in FIG. 19, the gap at the positions of the front beam structures 27 can be kept small. As a result, it is possible to suppress the influence of a gap between the intermediate holding frame 24 and the focus ring 13 enlarged with the fixation screw 17 fastened and a fluctuation in pressing forces of the front beam structures 27.

The interval θ may not be 120°, but is preferably equal to or smaller than 120°. The smaller the interval θ is, the closer to the radial direction RD1 the front beam structures 27 are. Therefore, the front beam structures 27 can be disposed at positions where the gap is small. Note that, although the description has been made while using the front beam structures 27 as an example in FIG. 19, the same applies to the rear beam structures 28.

In addition, as described in FIGS. 8 and 9, the beam extending directions of the front beam structures 27 are orthogonal to the optical axis direction OAD. According to such a configuration, the following effects can be achieved. That is, the front beam structures 27 abut onto the inner circumferential screw structure 13A of the focus ring 13. It is not preferable that the front beam structures 27 fall off an abutting surface of the inner circumferential screw structure 13A in a case where the lens holding frame 21 moves with respect to the focus ring 13.

Figure 21:
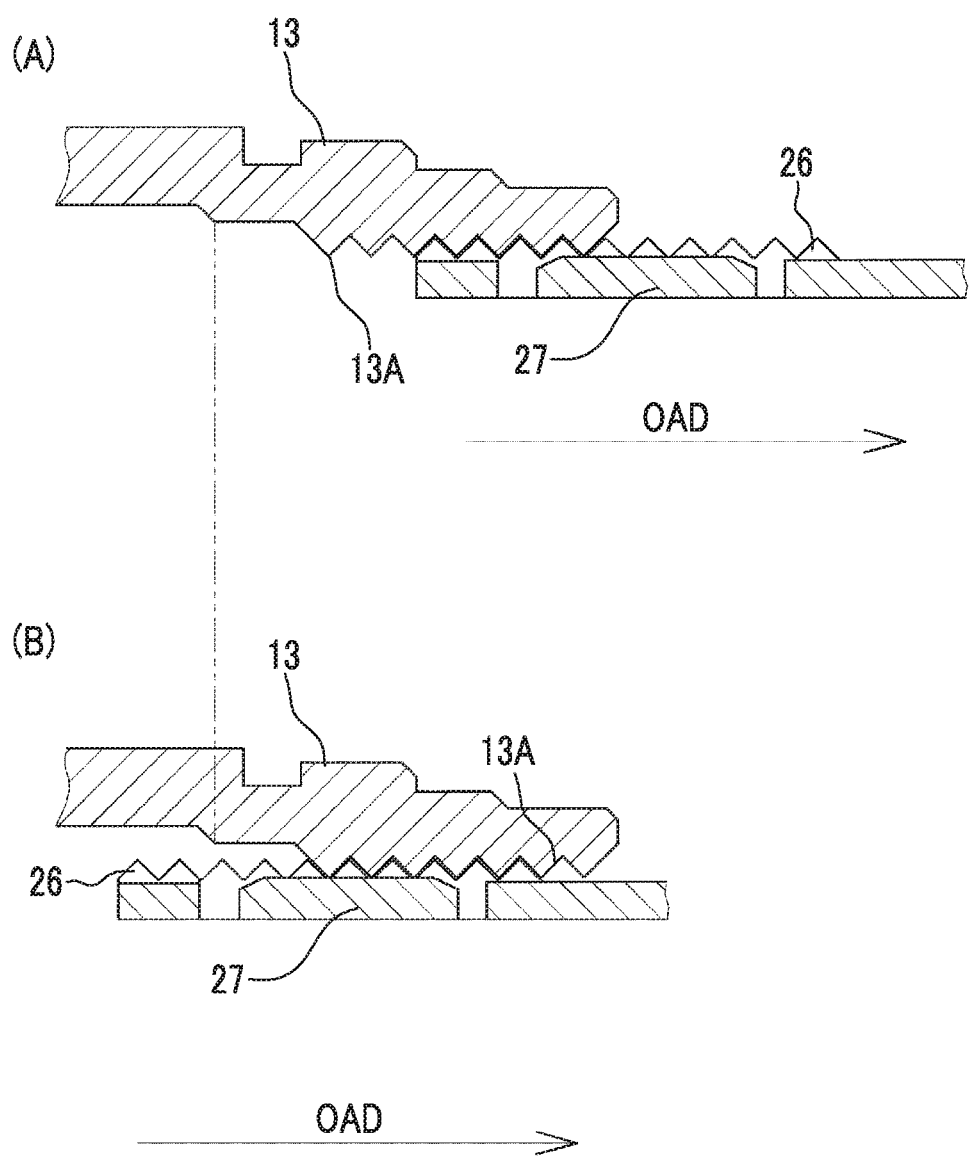
FIG. 21 is an explanatory view of an effect obtained in a case where a beam extending direction of a beam structure is disposed to be orthogonal to an optical axis direction, where (A) of FIG. 21 shows a state where the beam structure is on a rear side and (B) of FIG. 21 shows a state where the beam structure is on a front side.

As shown in FIG. 21, in a case where the beam extending direction of the front beam structure 27 is made orthogonal to the optical axis direction OAD, a width direction orthogonal to the beam extending direction of the front beam structure 27 is disposed to be orthogonal to the groove on the inner circumferential screw structure 13A at an abutting position between the inner circumferential screw structure 13A and the front beam structure 27.

According to such disposition, as shown in (A) of FIG. 21 and (B) of FIG. 21, the front beam structure 27 abuts onto a mountain part (minimum outer diameter part) of the inner circumferential screw structure 13A over the entire movement area at all times. Therefore, even in a case where there is a change corresponding to the movement of the lens holding frame 21 in the optical axis direction OAD, the front beam structure 27 only moves in the width direction and does not fall from the inner circumferential screw structure 13A.

Figure 22:
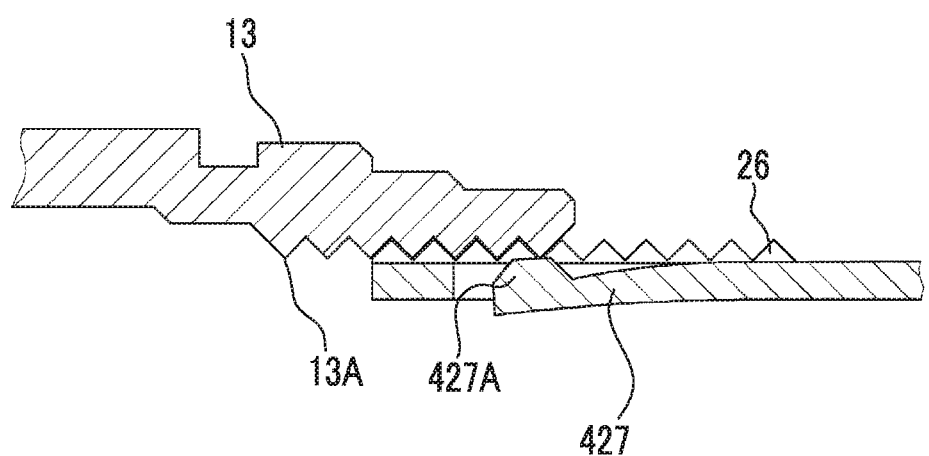
FIG. 22 is an explanatory view of a comparative example with respect to FIG. 21.

Comparison with an example shown in FIG. 22 makes the effects as described above more clear. A front beam structure 427 shown in FIG. 22 is disposed such that the beam extending direction thereof becomes parallel to the optical axis direction OAD. In this case, a direction in which the groove of the inner circumferential screw structure 13A extends and a width direction of the front beam structure 427 are parallel to each other. A longitudinal direction of a protruding structure 427A of the front beam structure 427 coincides with the direction in which the groove extends. In the case of such disposition, the protruding structure 427A is likely to fall off the inner circumferential screw structure 13A in a case where the protruding structure 427A has an elongated shape. Therefore, in the example shown in FIG. 22, the front beam structure 427 falls off the inner circumferential screw structure 13A in a case where the lens holding frame 21 moves in the optical axis direction OAD in a state where the lens optical system 20 is at the foremost end.

Figure 23:
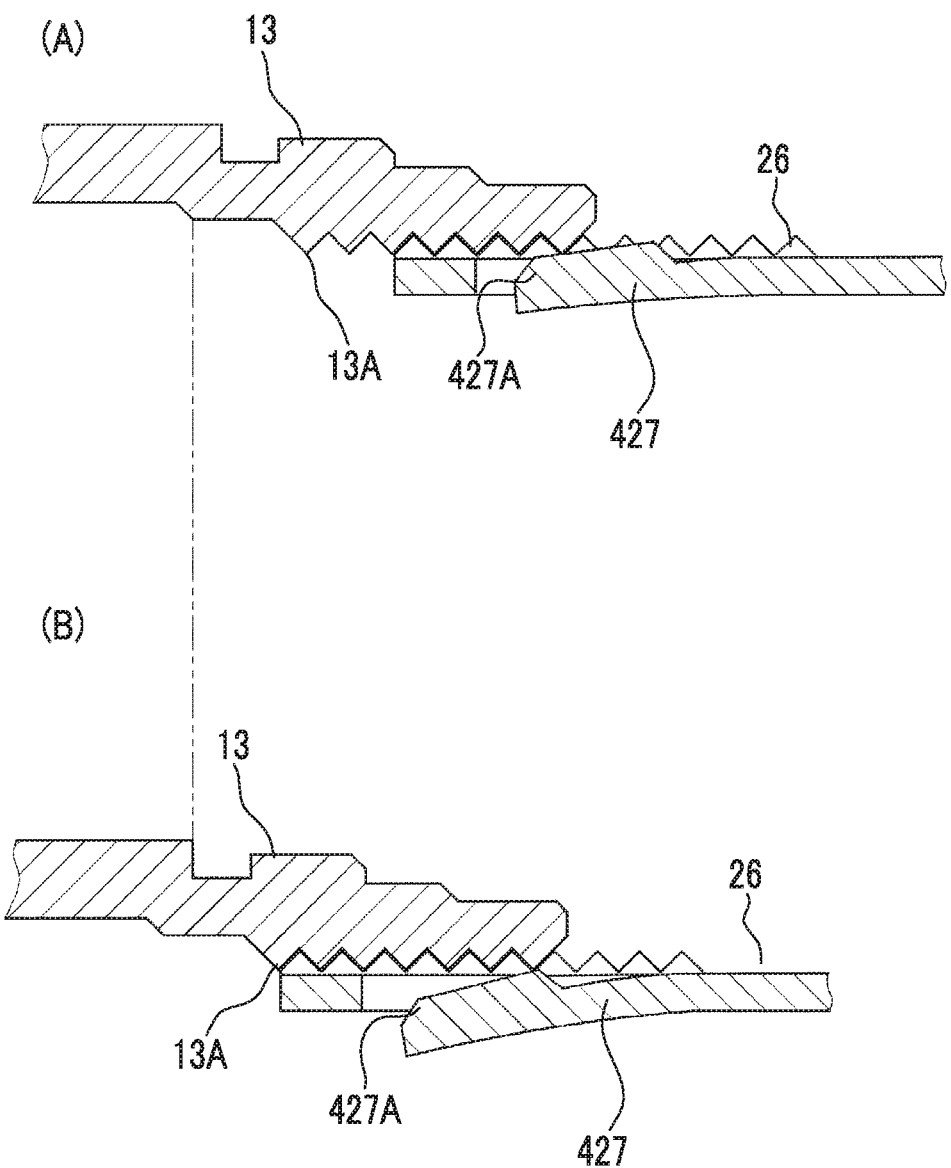
FIG. 23 is an explanatory view of another comparative example with respect to FIG. 21, where (A) of FIG. 23 and (B) of FIG. 23 show respective states where the positions of the beam structure in the optical axis direction are different from each other.

In addition, in FIG. 22, the smaller the width of the protruding structure 427A provided at a free end in the beam extending direction is, the more the falling off of the front beam structure 427 is influenced. Therefore, as a method of suppressing the falling off, a method of increasing the width of the protruding structure 427A in the beam extending direction as shown in FIG. 23 is conceivable. However, in a case where the width of the protruding structure 427A is increased in this manner, the front beam structure 427 becomes not likely to be bent and it becomes difficult to manage a restoring force.

Therefore, as in the present example shown in FIG. 21, it is preferable that the beam extending direction of the front beam structure 27 is made orthogonal to the optical axis direction OAD. Note that, although the description has been made while using the front beam structures 27 as an example, this may be applied to the rear beam structures 28. That is, in a case where the rear beam structures 28 abut onto an inner circumferential screw part of a constituent member constituting the outer tube, a similar problem occurs for the rear beam structures 28 also. In this case, it is preferable that the beam extending directions of the rear beam structures 28 are also made orthogonal to the optical axis direction OAD as shown in FIG. 21. In addition, such disposition may be applied to both of the front beam structures 27 and the rear beam structures 28.

In addition, although the embodiment of the lens unit 11 described in FIGS. 1 to 13 has various effects as shown in FIGS. 14 to 23, it is a matter of course that modification may be appropriately applied thereto. Although the intermediate holding frame 24 has been described as an example of a flexible frame body with which the front beam structures 27 and the rear beam structures 28 are integrally provided, the flexible frame body may not be the intermediate holding frame 24 and may be any of members constituting the lens holding frame 21. In addition, a member constituting the outer tube onto which the front beam structures 27 and the rear beam structures 28 abut is not limited to the focus ring 13 or the tube main body 14 and may be a member other than those.

Although the front beam structures 27 and the rear beam structures 28 configured as cantilevered beams have been described as an example of beam structures for preventing the lens holding frame 21 from vibrating with respect to the outer tube, at least one of the front beam structures 27 or the rear beam structures 28 may be configured as double-supported beams as shown in FIG. 15.

In addition, at least one of the front beam structures 27 or the rear beam structures may be configured by using the cantilevered beam 327 on which the protruding structure 327A is provided over the entire area in the beam extending direction as shown in FIG. 17 and may be configured by using the beam structure 427 as shown in FIG. 23.

In addition, although an example where the front beam structures 27 and the rear beam structures 28 are provided at intervals in the optical axis direction OAD has been described above, the beam structures may be disposed at three or more positions in the optical axis direction OAD. In addition, although an example where the beam structures are provided at two positions in the circumferential direction has been described, the beam structures may be provided at three or more positions. In addition, the beam structures may be disposed at two positions as shown in FIG. 20.

Furthermore, although the beam structure has been described as an example of an abutment that prevents the lens holding frame 21 from vibrating, the abutment may not be the beam structure. For example, only a protruding structure may be provided without making a cut in the outer circumferential surface 24A of the intermediate holding frame 24 and the protruding structure may function as the abutment.

In addition, although the focus ring 13 has been described as an example of an operation ring that moves the lens holding frame 21 in the optical axis direction OAD, the focus ring 13 may be an operation ring for moving a zoom lens.

It is a matter of course that the present invention is not limited to the above-described embodiment and various configurations can be adopted without departing from the gist of the present invention. For example, the present invention can be applied to a lens unit that is used for a general-purpose digital camera other than the machine vision camera 10, for example. In addition, the present invention can also be applied to a lens unit in which a projection optical system of a projector is installed.

EXPLANATION OF REFERENCES

- 10: machine vision camera
- 11: lens unit
- 12: camera main body
- 13: focus ring
- 13A: inner circumferential screw structure
- 13B: valley part
- 14: tube main body
- 14A: inner circumferential surface
- 15: iris ring
- 16: retaining part
- 17: fixation screw
- 18: fixation screw
- 20: lens optical system
- 20A: front lens unit
- 20B: rear lens unit
- 21: lens holding frame
- 22: front holding frame
- 23: rear holding frame
- 24: intermediate holding frame
- 24A: outer circumferential surface
- 26: outer circumferential screw structure
- 27: front beam structure
- 27A, 28A: protruding structure
- 27B, 28B: abutting surface
- 27C, 28C: inclined surface
- 28: rear beam structure
- 127: cantilevered beam
- 127A: protruding structure
- 227: double-supported beam
- 227A: protruding structure
- 327: cantilevered beam
- 327A: protruding structure
- 427: front beam structure
- 427A: protruding structure
- CD: circumferential direction
- G1: graph
- G2: graph
- OA: optical axis
- OAD: optical axis direction
- PD: pressing direction
- PP: point
- RD1: radial direction
- RD2: radial direction
- TL: lower limit value
- TU: upper limit value
- θ: interval

What is claimed is:

1. A lens unit comprising:
   an outer tube;
   a lens holding frame that holds a lens optical system, is accommodated in the outer tube, and is movable with respect to the outer tube in an optical axis direction parallel to an optical axis of the lens optical system;
   a flexible frame body that constitutes at least a part of the lens holding frame, is formed of a flexible material, and has a tubular shape; and
   an abutment that is integrally provided with the flexible frame body, abuts onto an inner circumferential surface of the outer tube in a state of being elastically deformed such that a restoring force is generated, and prevents vibration caused by a gap between an outer circumferential surface of the lens holding frame and the inner circumferential surface of the outer tube.

2. The lens unit according to claim 1,
   wherein the abutment is a beam structure that is defined by a cut formed in an outer circumferential surface of the flexible frame body, and
   wherein a protruding structure that further protrudes toward the inner circumferential surface of the outer tube than a vicinity of the beam structure is formed on the beam structure.

3. The lens unit according to claim 2,
   wherein the beam structure is a cantilevered beam of which one end is a free end and the other end is a fixed end.

4. The lens unit according to claim 3,
   wherein the protruding structure is disposed on the free end of the cantilevered beam and has an elongated shape of which a longitudinal direction is a direction orthogonal to a beam extending direction.

5. The lens unit according to claim 2,
   wherein a plurality of the beam structures are provided on the outer circumferential surface of the flexible frame body.

6. The lens unit according to claim 5,
wherein, in a case where an object side of the lens optical system is a front side and an image side is a rear side in the optical axis direction,
the beam structures include a front beam structure and a rear beam structure that are provided at an interval in the optical axis direction of the flexible frame body.

7. The lens unit according to claim 5,
wherein the beam structures are provided at a plurality of positions at an interval in a circumferential direction around the optical axis of the flexible frame body.

8. The lens unit according to claim 7,
wherein the beam structures are provided at two positions in the circumferential direction, and
wherein an interval between the beam structures at the two positions is equal to or smaller than 120°.

9. The lens unit according to claim 6,
wherein the beam structures are provided at a plurality of positions at an interval in a circumferential direction around the optical axis of the flexible frame body, and
wherein the front beam structures and the rear beam structures are provided at a plurality of positions at intervals in the circumferential direction around the optical axis.

10. The lens unit according to claim 9,
wherein the front beam structures and the rear beam structures, which are provided at the plurality of positions, are at the same positions as each other in the circumferential direction.

11. The lens unit according to claim 9, further comprising:
an operation ring that is provided on the outer tube, is rotated in the circumferential direction around the optical axis, and moves the lens holding frame in the optical axis direction in a case where the operation ring is rotated,
wherein one of the front beam structures or the rear beam structures of the flexible frame body abut onto an inner circumferential surface of the operation ring.

12. The lens unit according to claim 11,
wherein at least a part of the inner circumferential surface of the operation ring has an inner circumferential screw structure that engages with an outer circumferential screw structure formed on an outer circumference of the lens holding frame and on which a groove is formed in the circumferential direction around the optical axis,
wherein at least one of the front beam structures or the rear beam structures abut onto the inner circumferential screw structure, and
wherein abutting positions between the beam structures abutting onto the inner circumferential screw structure and the inner circumferential screw structure change in accordance with a position of the lens holding frame in the optical axis direction and beam extending directions of the beam structures are orthogonal to the optical axis direction.

13. The lens unit according to claim 11,
wherein a fixation screw that presses a point on an outer circumferential surface of the operation ring toward the optical axis in a radial direction such that the inner circumferential surface of the operation ring is pressed against the outer circumferential surface of the flexible frame body and a position of the operation ring in the circumferential direction is fixed is provided,
wherein at least one of the front beam structures or the rear beam structures are disposed at two positions in the circumferential direction, and
wherein positions of the beam structures at the two positions are disposed symmetrically with a straight line extending in a pressing direction of the fixation screw, which coincides with the radial direction, as an axis of symmetry and an interval between the beam structures at the two positions is equal to or smaller than 120°.

14. The lens unit according to claim 2,
wherein a surface of the protruding structure that abuts onto the inner circumferential surface of the outer tube is formed as a curved surface having the same curvature as the inner circumferential surface in accordance with a shape of the inner circumferential surface.

15. The lens unit according to claim 2,
wherein a vicinity of the protruding structure is chamfered.

* * * * *